US011405962B2

United States Patent
Viger et al.

(10) Patent No.: US 11,405,962 B2
(45) Date of Patent: Aug. 2, 2022

(54) ACCESS MANAGEMENT TO MULTI-USER UPLINK RANDOM RESOURCE UNITS BY A PLURALITY OF BSSS

(71) Applicant: CANON KABUSHIKI KAISHA, Tokyo (JP)

(72) Inventors: Pascal Viger, Janze (FR); Stéphane Baron, Le Rheu (FR); Julien Sevin, Saint Aubin du Cormier (FR); Patrice Nezou, Liffre (FR)

(73) Assignee: Canon Kabushiki Kaisha, Tokyo (JP)

( * ) Notice: Subject to any disclaimer, the term of this patent is extended or adjusted under 35 U.S.C. 154(b) by 52 days.

(21) Appl. No.: 16/976,010

(22) PCT Filed: Feb. 20, 2019

(86) PCT No.: PCT/EP2019/054189
§ 371 (c)(1),
(2) Date: Aug. 26, 2020

(87) PCT Pub. No.: WO2019/166295
PCT Pub. Date: Sep. 6, 2019

(65) Prior Publication Data
US 2021/0051728 A1 Feb. 18, 2021

(30) Foreign Application Priority Data

Mar. 1, 2018 (GB) ...................... 1803382

(51) Int. Cl.
*H04W 74/08* (2009.01)
*H04W 40/24* (2009.01)
(Continued)

(52) U.S. Cl.
CPC ..... *H04W 74/0833* (2013.01); *H04W 40/244* (2013.01); *H04W 72/121* (2013.01); *H04W 74/006* (2013.01); *H04W 74/0808* (2013.01)

(58) Field of Classification Search
None
See application file for complete search history.

(56) References Cited

U.S. PATENT DOCUMENTS

2015/0139209 A1* 5/2015 Park ...................... H04W 76/00
370/338
2015/0382283 A1* 12/2015 Wang ................ H04W 52/0216
370/328

(Continued)

FOREIGN PATENT DOCUMENTS

WO 2017/005893 A1 1/2017
WO WO-2017005893 A1 * 1/2017 ............ H04W 16/14

*Primary Examiner* — Ayaz R Sheikh
*Assistant Examiner* — Faiyazkhan Ghafoerkhan
(74) *Attorney, Agent, or Firm* — Canon U.S.A., Inc. IP Division

(57) ABSTRACT

The present invention relates to a wireless communication method in a wireless network comprising an access point and stations. The method comprises, at a station: receiving a trigger frame from the access point, the trigger frame reserving a transmission opportunity on at least one communication channel of the wireless network, the transmission opportunity including a random resource unit that the stations may access using a contention scheme; receiving parameters of the contention scheme in management frames from the access point, the parameters comprising a contention window range; contending access to the random resource unit of the transmission opportunity reserved by the received trigger frame, using a contention window value; and updating the contention window value based on the success or failure of the access to the random resource unit. The updated contention window value remains within the contention window range obtained from the most recently received contention scheme parameters.

9 Claims, 10 Drawing Sheets

(51) Int. Cl.
  *H04W 72/12* (2009.01)
  *H04W 74/00* (2009.01)

(56) References Cited

U.S. PATENT DOCUMENTS

| | | | |
|---|---|---|---|
| 2016/0183239 A1* | 6/2016 | Lee | H04W 72/1215 |
| | | | 370/329 |
| 2016/0183241 A1* | 6/2016 | Lee | H04W 72/0406 |
| | | | 455/425 |
| 2016/0267136 A1* | 9/2016 | Dixit | G06F 16/24544 |
| 2017/0231002 A1* | 8/2017 | Babaei | H04L 5/0091 |
| 2017/0231005 A1* | 8/2017 | Babaei | H04L 5/0007 |
| 2018/0167976 A1* | 6/2018 | Wentink | H04W 74/0841 |
| 2018/0199375 A1* | 7/2018 | Nezou | H04W 74/006 |
| 2019/0200278 A1* | 6/2019 | Ouzieli | H04W 12/106 |
| 2019/0313466 A1* | 10/2019 | Ko | H04W 84/12 |
| 2020/0163129 A1* | 5/2020 | Ko | H04W 74/00 |

* cited by examiner

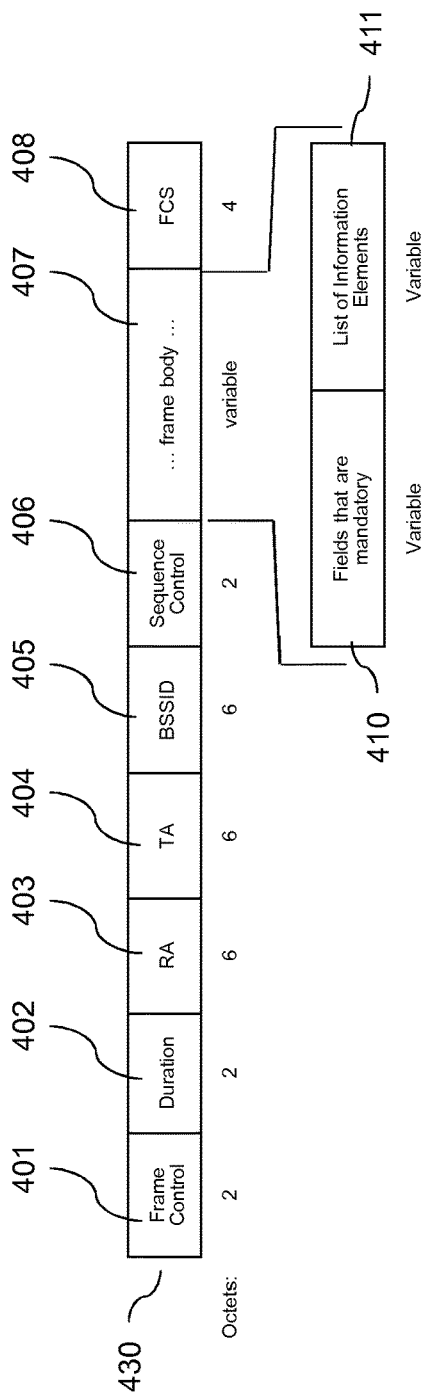
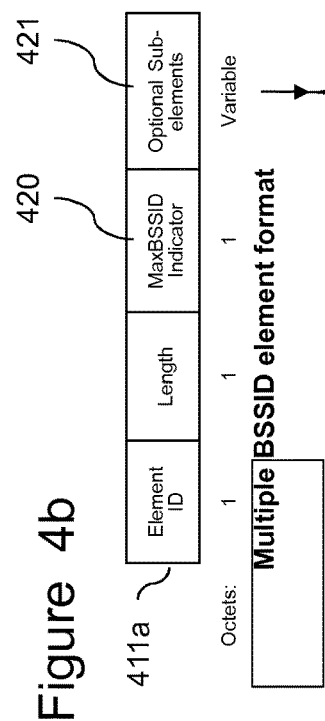
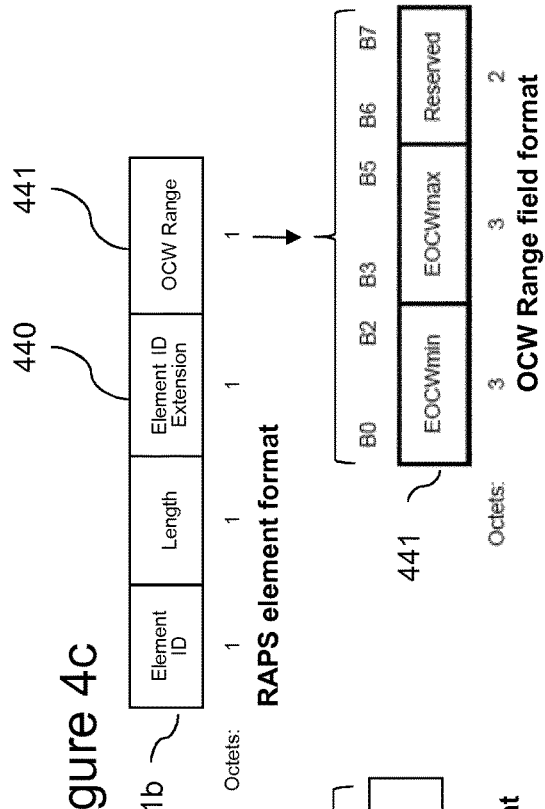
Figure 4a
Figure 4b
Figure 4c

ACCESS MANAGEMENT TO MULTI-USER UPLINK RANDOM RESOURCE UNITS BY A PLURALITY OF BSSS

CROSS-REFERENCE TO RELATED APPLICATIONS

This application is the National Phase application of PCT Application No. PCT/EP2019/054189, filed on Feb. 20, 2019 and titled "IMPROVED ACCESS MANAGEMENT TO MULTI-USER UPLINK RANDOM RESOURCE UNITS BY A PLURALITY OF BSSs". This application claims the benefit under 35 U.S.C. § 119(a)-(d) of United Kingdom Patent Application No. 1803382.9, filed on Mar. 1, 2018. The above cited patent applications are hereby incorporated by reference herein in their entireties.

FIELD OF THE INVENTION

The present invention relates generally to communication networks and more specifically to the sending of data over a communication channel which is split into sub-channels (or Resource Units) that may be shared in the frequency domain by multiple stations.

The invention finds application in wireless communication networks, in particular to the access of an 802.11ax composite channel and of OFDMA Resource Units forming for instance an 802.11ax composite channel for Uplink communication.

BACKGROUND OF THE INVENTION

The IEEE 802.11 MAC family of standards (a/b/g/n/ac/ etc.) define a way wireless local area networks (WLANs) must work at the physical and medium access control (MAC) level. Typically, the 802.11 MAC (Medium Access Control) operating mode implements the well-known Distributed Coordination Function (DCF) which relies on a contention-based mechanism based on the so-called "*Carrier Sense Multiple Access with Collision Avoidance*" (CSMA/CA) technique.

More recently, Institute of Electrical and Electronics Engineers (IEEE) officially approved the 802.11ax task group, as the successor of 802.11ac. The primary goal of the 802.11ax task group consists in seeking for an improvement in data speed to wireless communicating devices used in dense deployment scenarios.

In this context, multi-user (MU) transmission has been considered to allow multiple simultaneous transmissions to/from different users in both downlink (DL) and uplink (UL) directions, e.g., from an Access Point (AP) to non-AP stations or from non-AP stations to an AP. These simultaneous transmissions are operated during a transmission opportunity granted to the AP. In the uplink, multi-user transmissions can be used to mitigate the collision probability by allowing multiple non-AP stations to simultaneously transmit. To actually perform such multi-user transmission, it has been proposed to split a granted communication channel into sub-channels, also referred to as Resource Units (RUs), that are shared in the frequency domain by multiple non-AP stations, based for instance on the Orthogonal Frequency Division Multiple Access (OFDMA) technique.

The above is introduced with respect to a single group of non-AP stations that is managed by the access point with which each non-AP station has previously registered. In the 802.11 standard, such a group of non-AP stations together with the access point is known as a Basic Service Set (BSS). The access point acts as a master to control the non-AP stations within the BSS. The simplest BSS consists of one access point and one non-AP station.

Each BSS is uniquely identified by a specific Basic Service Set Identification (BSSID). For a BSS operating in infrastructure mode, i.e. non-AP stations communicate through the AP, the specific BSSID is usually a 48-bit MAC address of the access point. The specific BSSID is the formal name of the BSS and is always associated with only one BSS.

Together with the specific BSSID, each BSS has its own service set identification, SSID, which is usually a human readable identifier of the BSS.

In a BSS, non-AP stations usually contend for access to the communication medium as described above.

Recent developments provide that a single physical AP can operate as the master of a plurality of BSSs, i.e. of a plurality of independent groups of non-AP stations. This avoids using one physical AP per BSS or WLAN. It also makes it possible to use the same primary channel for all BSSs, thereby avoiding channel interference problems.

Such operating scheme where a plurality of BSSs is managed by the same physical AP is performed through so-called virtual access points (virtual APs or VAPs).

A virtual AP is a logical entity that resides within a physical Access Point (AP). To a non-AP client station, the VAP appears as an independent access point with its own unique SSID. To implement virtual APs, multiple BSSIDs are used with associated SSIDs. The BSSIDs for the VAPs in the physical AP are usually generated from a base BSSID specific to the underlying physical AP, usually the base MAC address of the AP.

The terms Virtual AP, specific BSSID, BSS and SSID can be used synonymously throughout this document, to designate a group or cell of non-AP stations managed by a physical AP. Depending on the context, specific BSSID and own SSID may further refer to the identifier of a BSS/WLAN, either through a MAC address (specific BSSID) or a human readable identifier (own SSID).

Providing a plurality of SSIDs (or BSS) corresponds to providing various different networks in a particular area. It may give access to different resources and present services which may have differing management or security policies applied. This advantageously allows various categories of users, e.g. staff, students or visitors etc. to be provided with network services which are appropriate to them.

In conventional 802.11 approaches, only one SSID (or BSS) is advertised per signaling message such as a beacon frame. As a consequence, multiple beacons are used to advertise the SSIDs corresponding to the virtual APs configured at the physical AP. This solution is compatible with most 802.11 stations and also allows the SSIDs to support different capability sets.

However, the higher the number of BSSs, the higher the transmission of signaling messages, and as a consequence the higher the channel use. This downside is further increased because the signaling messages are transmitted at low bit rate, usually at the lowest supported data rate so that all client stations can receive it.

To improve this situation of increased channel use in case of multiple BSSs, the IEEE 802.11v Wireless Network Management specification defines a mechanism to advertise multiple security profiles including BSSID/SSID advertisements, with a single beacon frame.

However, the resulting network management is not satisfactory. In particular, the medium access for uplink communication through trigger frames using contention access is performed independently for each BSS and the support for multi-BSS Trigger frames is not provided.

SUMMARY OF INVENTION

It is a broad objective of the present invention to improve this situation, i.e. to overcome some or all of the foregoing limitations. In particular, the present invention seeks to provide a more efficient usage of the UL MU random access procedure in case of multiple BSS group.

In embodiments, the invention provides a wireless communication method in a wireless network comprising an access point and stations, the method comprising the following steps, at a station:

receiving a trigger frame from the access point, the trigger frame reserving a transmission opportunity on at least one communication channel of the wireless network, the transmission opportunity including a random resource unit that the stations may access using a contention scheme;

receiving parameters of the contention scheme in management frames from the access point, the parameters comprising a contention window range;

contending access to the random resource unit of the transmission opportunity reserved by the received trigger frame, using a contention window value; and updating the contention window value based on the success or failure of the access to the random resource unit;

wherein the updated contention window value remains within the contention window range obtained from the most recently received contention scheme parameters.

Optionally, the contention window value is chosen in the contention window range; if the updated contention window value becomes greater than the upper boundary of the last received contention window range, the updated contention window value is set to the value of the upper boundary; the management frames are beacon frames; and/or the management frames are probe response frames.

Other embodiments provide a wireless communication method in a wireless network comprising a physical access point and stations organized into a plurality of groups, each group being managed by a virtual access point implemented in the physical access point, the method comprising the following steps, at a station belonging to a first group among the plurality of groups:

receiving a trigger frame from the physical access point, the trigger frame reserving a transmission opportunity on at least one communication channel of the wireless network, the transmission opportunity including random resource units that the stations may access using a contention scheme;

contending access to a random resource unit of the transmission opportunity reserved by the received trigger frame, using the contention scheme; and updating at least one parameter of the contention scheme based on the success or failure of the access to the random resource unit;

wherein the trigger frame specifically identifies the first group or a plurality of groups, stations of which are allowed to access a random resource unit to transmit data; and wherein the at least one parameter is re-initialized each time the group(s) identified by the trigger frame changes relatively to a last received trigger frame.

Yet other embodiments provide a wireless communication method in a wireless network comprising a physical access point and stations organized into a plurality of groups, each group being managed by a virtual access point implemented in the physical access point, the method comprising the following steps, at a station belonging to a first group among the plurality of groups:

receiving a first trigger frame then a second trigger frame from the physical access point, each trigger frame identifies the first group or a plurality of groups and reserves a transmission opportunity on at least one communication channel of the wireless network, the transmission opportunity including random resource units that the stations may access using a contention scheme; and setting at least one parameter of the contention scheme for contending access to a random resource unit of the transmission opportunity reserved by the second trigger frame;

wherein the setting is based on whether the first and second trigger frames identify the same group or groups, or not.

By same group or groups, it is meant whether the first and second trigger frames both identify the first group, or they both identify the plurality of groups. If not, i.e. the group(s) identified in the second trigger frame is (are) different from the group(s) identified in the first trigger frame, one trigger frame identifies the first group and the other trigger frame identifies a plurality of groups.

In an embodiment, the setting comprises re-initializing the parameter if the group(s) identified in the second trigger frame is (are) different from the group(s) identified in the first trigger frame.

Another aspect of the invention relates to a non-transitory computer-readable medium storing a program which, when executed by a microprocessor or computer system in a device, causes the device to perform any method as defined above.

The non-transitory computer-readable medium may have features and advantages that are analogous to those set out above and below in relation to the methods and devices.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Further advantages of the present invention will become apparent to those skilled in the art upon examination of the drawings and detailed description. Embodiments of the invention will now be described, by way of example only, and with reference to the following drawings.

FIGS. 4a, 4b and 4c present the format of a beacon frame according to the 802.11 standard, including the Information Elements representative of the RAPS set and the Multi-BSS configuration.

DETAILED DESCRIPTION

The invention will now be described by means of specific non-limiting exemplary embodiments and by reference to the figures.

Figure 1:
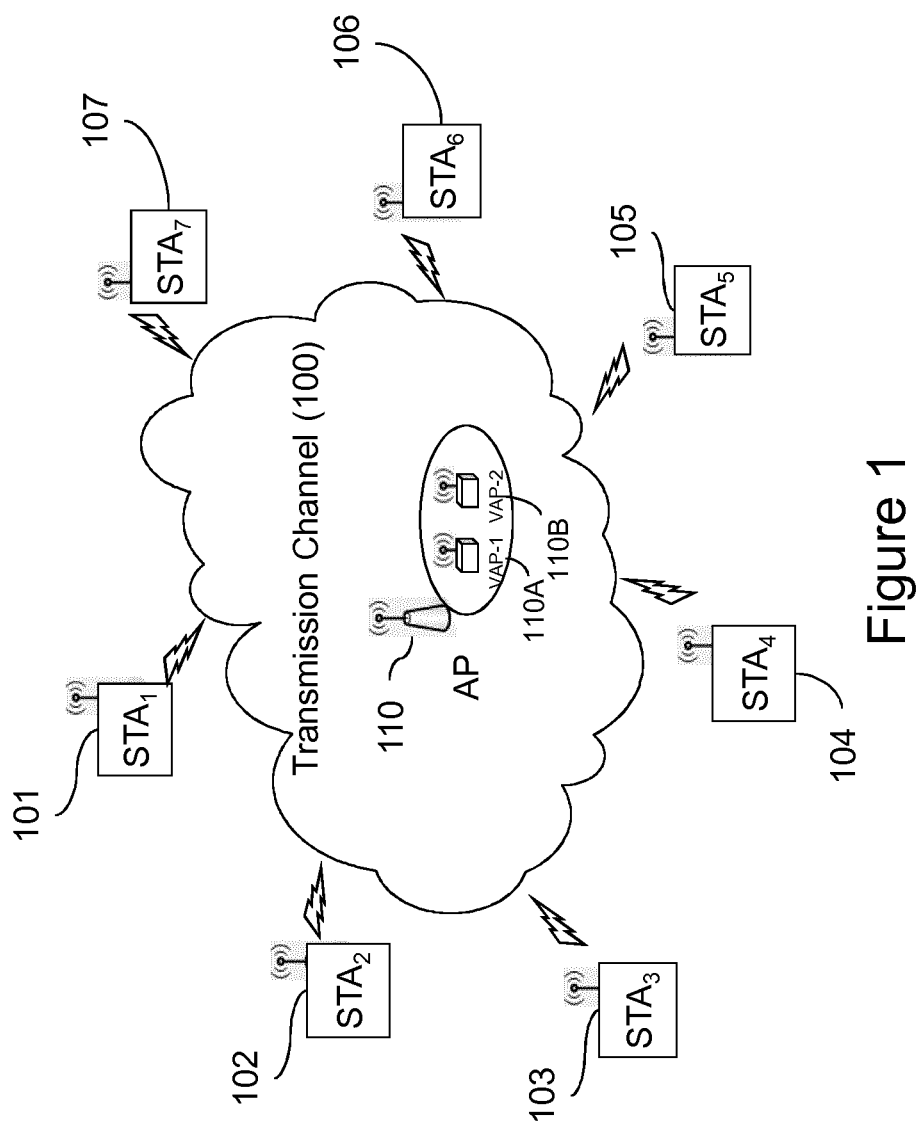
FIG. 1 illustrates a typical wireless communication system in which embodiments of the invention may be implemented.

FIG. 1 illustrates a communication system in which several communication nodes (or non-AP stations) 101-107 exchange data frames over a radio transmission channel 100 of a wireless local area network (WLAN), under the management of a central station, or access point (AP) 110. The radio transmission channel 100 is defined by an operating frequency band constituted by a single channel or a plurality of channels forming a composite channel.

Access to the shared radio medium to send data frames is based on the CSMA/CA technique, for sensing the carrier and avoiding collision by separating concurrent transmissions in space and time.

Carrier sensing in CSMA/CA is performed by both physical and virtual mechanisms. Virtual carrier sensing is achieved by transmitting control frames to reserve the medium prior to transmission of data frames.

Next, a source station, including the AP, first attempts through the physical mechanism, to sense a medium that has been idle for at least one DIFS (standing for DCF InterFrame Spacing) time period, before transmitting data frames.

However, if it is sensed that the shared radio medium is busy during the DIFS period, the source station continues to wait until the radio medium becomes idle.

To access the medium, the source station starts a count-down backoff counter designed to expire after a number of timeslots, chosen randomly in a contention window range [0, CW], CW (integer) being also referred to as the Contention Window size and defining the upper boundary of the backoff selection interval (contention window range). This backoff mechanism or procedure is the basis of the collision avoidance mechanism that defers the transmission time for a random interval, thus reducing probability of collisions on the shared channel. After the backoff time period, the source station may send data or control frames if the medium is idle.

One problem of wireless data communications is that it is not possible for the source station to listen while sending, thus preventing the source station from detecting data corruption due to channel fading or interference or collision phenomena. A source station remains unaware of the corruption of the sent data frames and continues to transmit the frames unnecessarily, thus wasting access time.

The Collision Avoidance mechanism of CSMA/CA thus provides positive acknowledgement (ACK) of the sent data frames by a receiving station if the frames are received with success, to notify the source station that no corruption of the sent data frames occurred.

The ACK is transmitted at the end of reception of the data frame, immediately after a period of time called Short InterFrame Space (SIFS).

If the source station does not receive the ACK within a specified ACK timeout or detects the transmission of a different frame on the channel, it may infer data frame loss. In that case, it generally reschedules the frame transmission according to the above-mentioned backoff procedure.

The wireless communication system of FIG. 1 comprises a physical access point 110 configured to manage two or more WLANs (or BSSs), i.e. two or more groups of non-AP stations. Each BSS is uniquely identified by a specific basic service set identification, BSSID and managed by a virtual AP implemented in the physical AP.

In the example shown, the physical AP implements two virtual APs, virtual AP 1 VAP-1 (110A) having MAC address MAC1 as specific BSSID to manage a first WLAN (BSS), and virtual AP 2 VAP-2 (110B) having MAC address MAC2 as specific BSSID to manage a second WLAN (BSS). Of course more WLANs can be implemented, requiring a corresponding number of virtual APs to be implemented in the physical AP.

All MAC addresses for the virtual APs are generated based on (or "derive from") a base MAC address specific to the physical access point, usually the base 48-bit MAC address of AP 110. For instance $MAC_i$ ('i' being a BSS index) used as specific BSSID(i) for virtual $AP_i$ is generated as follows, from the base MAC address BASE_BSSID:

$MAC_i$=BSSID(i)=(BASE_BSSID modified to set the
$n$LSBs to zero)|(($n$LSBs of BASE_BSSID)+$i$)
mod $2^n$)

where LSB refers to the least significant bits, "n" is an AP parameter (integer) such that 2 to the power n ($2^n$) is the maximum number of BSSIDs supported by the access point, and '|' operator is an XOR operator. The specific BSSID(i) thus differ one from the other by their n LSBs. The 48-n MSBs of the generated specific BSSIDs are all similar to the corresponding bits of BASE_SSID.

As an example, virtual AP 1 provides a WLAN with "guest" as SSID that one or more stations can join, while virtual AP 2 provides a WLAN with "Employee" as SSID that other stations can join simultaneously. The security scheme for each WLAN may be different, e.g. WEP and WPA. A same device can usually join two WLANs simultaneously if it has two separate WLAN interfaces (e.g. wifi network cards). In that case, the device is considered as two non-AP stations in the network, each non-AP station being able to join only one WLAN at a time.

Some control frames sent by the AP are an important part of 802.11, for instance beacon frames and probe response frames. The non-AP stations are waiting for these frames to know about the available WLANs or BSSs.

These frames let the non-AP stations know that an AP and one or more WLANs are available, but also notify the non-AP stations about important information such as the corresponding SSID or SSIDs, the corresponding specific BSSID or BSSIDs, the communication mode (Infrastructure or Ad-Hoc), the security schemes used (e.g. Open, WEP, WPA-PSK or 802.1X), the support transmission rates used, the channel in operation and optional Information Elements (IE).

When multiple BSSs are provided, multiple beacon frames are transmitted by the AP, one for each active BSS, usually each 100 ms. It results in that the non-AP stations have to process beacon frames more frequently and that channel occupation due to control frames is increased (being noted that the control frames such as the beacon frames are transmitted at low rate).

These drawbacks can be reduced for example by increasing the beacon interval (more than 100 ms) so that the beacon frame of each BSS is sent less frequently. However, this may cause some stations not to detect the beacon frame of a given BSS when scanning, and thus to consider that a particular BSS (through its SSID) is not available.

To improve this situation, the IEEE 802.11v Wireless Network Management specification provides a mechanism to advertise multiple security profiles including BSSID advertisements. Thus, a single Beacon frame is sent rather than multiple Beacon frames in order to advertise a plurality of specific BSSIDs/SSIDs. In this mechanism, a new Information Element (IE) is defined (Multiple BSSID IE) in the beacon frames sent by one or the other of the multiple virtual APs (i.e. specific BSSIDs).

The transmitter address of such a beacon frame includes the specific BSSID of the transmitting virtual AP. Furthermore, the Multiple BSSID IE indicates that multiple BSSs is contemplated and provides an indication of the maximum number of BSSs, parameter "n", to the non-AP stations, as well as the common, inherited information element values of all of the BSSs (e.g. so that all members of the set use a common operating class, channel, channel access functions, etc.) and the unique information elements of each of the other BSSs indexed by their BSSID indexes 'i' (i.e. different advertised capabilities of the various BSSs, including ones from the BSS of the transmitting VAP).

As mentioned above, a BSSID index 'i' is a value between 1 and $2^n-1$, which identifies the BSSID. It may also be noted that the AP may include two or more Multiple BSSID elements containing elements for a given BSSID index in one Beacon frame.

Such a multi-BSS beacon frame may also transmit the base MAC address BASE_BSSID to the stations.

Figure 2:
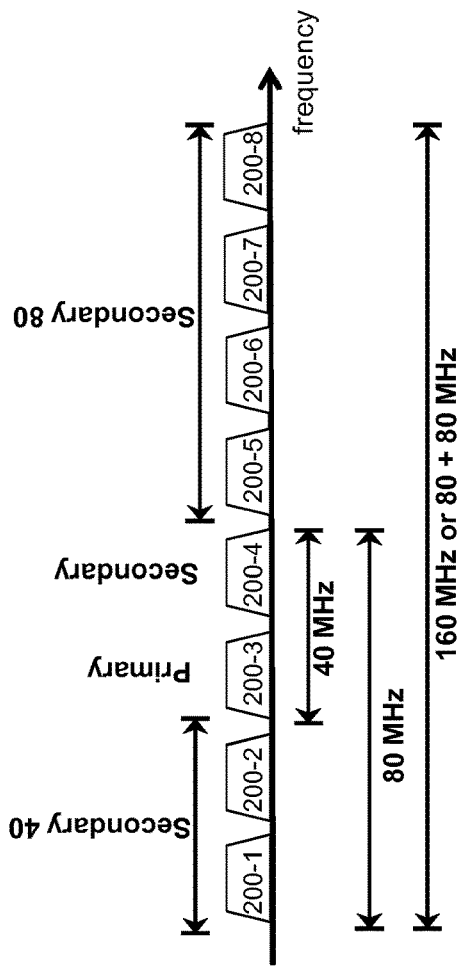
FIG. 2 illustrates 802.11ac channel allocation that support channel bandwidth of 20 MHz, 40 MHz, 80 MHz or 160 MHz as known in the art.

To meet the ever-increasing demand for faster wireless networks to support bandwidth-intensive applications, 802.11ac is targeting larger bandwidth transmission through multi-channel operations. FIG. 2 illustrates 802.11ac channel allocation that support composite channel bandwidth of 20 MHz, 40 MHz, 80 MHz or 160 MHz.

IEEE 802.11ac introduces support of a restricted number of predefined subsets of 20 MHz channels to form the sole predefined composite channel configurations that are available for reservation by any 802.11ac station on the wireless network to transmit data.

The predefined subsets are shown in FIG. 2 and correspond to 20 MHz, 40 MHz, 80 MHz, and 160 MHz channel bandwidths, compared to only 20 MHz and 40 MHz supported by 802.11n. Indeed, the 20 MHz component channels 200-1 to 200-8 are concatenated to form wider communication composite channels.

In the 802.11ac standard, the channels of each predefined 40 MHz, 80 MHz or 160 MHz subset are contiguous within the operating frequency band, i.e. no hole (missing channel) in the composite channel as ordered in the operating frequency band is allowed.

The 160 MHz channel bandwidth is composed of two 80 MHz channels that may or may not be frequency contiguous. The 80 MHz and 40 MHz channels are respectively composed of two frequency adjacent or contiguous 40 MHz and 20 MHz channels, respectively. However the present invention may have embodiments with either composition of the channel bandwidth, i.e. including only contiguous channels or formed of non-contiguous channels within the operating band.

A station (including the AP) is granted a transmission opportunity (TXOP) through the enhanced distributed channel access (EDCA) mechanism on the "primary channel" (200-3). For each composite channel having a bandwidth, 802.11ac designates one channel as "primary" meaning that it is used for contending for access to the composite channel. The primary 20 MHz channel is common to all stations (STAs) belonging to the same basic set, i.e. managed by or registered to the same local Access Point (AP).

However, to make sure that no other station belonging to another set uses the secondary channels, it is provided that the control frames (e.g. RTS frame/CTS frame or trigger frame described below) reserving the composite channel are duplicated over each 20 MHz channel of such composite channel.

As addressed earlier, the IEEE 802.11ac standard enables up to four, or even eight, 20 MHz channels to be bound. Because of the limited number of channels (19 in the 5 GHz band in Europe), channel saturation becomes problematic. In densely populated areas, the 5 GHz band will surely tend to saturate even with a 20 or 40 MHz bandwidth usage per Wireless-LAN cell.

Developments in the 802.11ax standard seek to enhance efficiency and usage of the wireless channel for dense environments.

In this perspective, one may consider multi-user (MU) transmission features, allowing multiple simultaneous transmissions to different users in both downlink (DL) and uplink (UL) directions, once a transmission opportunity has been reserved. In the uplink, multi-user transmissions can be used to mitigate the collision probability by allowing multiple non-AP stations to simultaneously transmit to the AP.

To actually perform such multi-user transmission, a granted 20 MHz channel (200-1 to 200-4) may be split into at least one sub-channel, but preferably a plurality sub-channels 310 (elementary sub-channels), also referred to as sub-carriers or resource units (RUs) or "traffic channels", that are shared in the frequency domain by multiple users, based for instance on Orthogonal Frequency Division Multiple Access (OFDMA) technique.

This is illustrated with reference to FIG. 3.

The multi-user feature of OFDMA allows the AP to assign different sub-channels (or Resource Units) to different non-AP stations in order to increase competition within a reserved transmission opportunity TXOP. This may help to reduce contention and collisions on 802.11 networks.

In this example, each 20 MHz channel (200-1, 200-2, 200-3 or 200-4) is sub-divided in the frequency domain into four OFDMA sub-channels or RUs 310 of size 5 MHz. Of course the number of RUs splitting a 20 MHz channel may be different from four. For instance, between two to nine RUs may be provided (thus each having a size between 10 MHz and about 2 MHz). It is also possible to have a RU width greater than 20 MHz, when included in a wider composite channel (e.g. 80 MHz).

Contrary to downlink OFDMA wherein the AP can directly send multiple data to multiple non-AP stations (supported by specific indications inside the PLCP header), a trigger mechanism has been adopted for the AP to trigger MU uplink communications from various non-AP stations.

To support a MU uplink transmission (during a TXOP pre-empted by the AP), the 802.11ax AP has to provide signalling information for both legacy stations (i.e. non-802.11ax stations) to set their Network Allocation Vector field (NAV) and for 802.11ax client stations to determine the Resource Units allocation.

In the following description, the term legacy refers to non-802.11ax stations, meaning 802.11 stations of previous technologies that do not support OFDMA communications.

Figure 3:
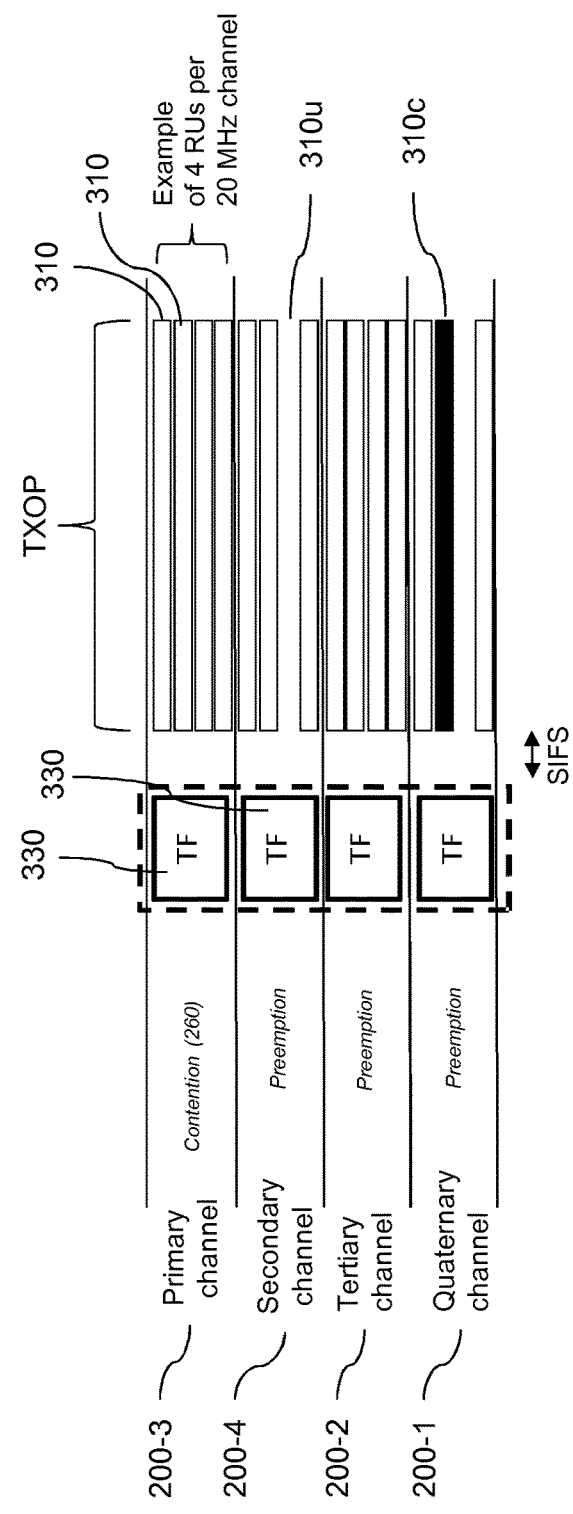
FIG. 3 illustrates an example of 802.11ax uplink OFDMA transmission scheme, wherein the AP issues a Trigger Frame for reserving a transmission opportunity of OFDMA sub-channels (resource units) on an 80 MHz channel as known in the art.

As shown in the example of FIG. 3, the AP sends a trigger frame (TF) 330 to the targeted 802.11ax stations to reserve a transmission opportunity. The bandwidth or width of the targeted composite channel for the transmission opportunity is indicated in the TF frame, meaning that the 20, 40, 80 or 160 MHz value is given. The TF frame is a control frame, according to the 802.11 legacy non-HT format, and is sent over the primary 20 MHz channel and duplicated (replicated) on each other 20 MHz channels forming the targeted composite channel. Due to the duplication of the control frames, it is expected that every nearby legacy station (non-HT or 802.11ac stations) receiving the TF on its primary channel, then sets its NAV to the value specified in the TF frame. This prevents these legacy stations from accessing the channels of the targeted composite channel during the TXOP.

Based on an AP's decision, the trigger frame TF may define a plurality of resource units (RUs) 310. The multi-user feature of OFDMA allows the AP to assign different RUs to different client stations in order to increase competition. This may help to reduce contention and collisions inside 802.11 networks.

The trigger frame 330 may designate "Scheduled" RUs, which may be reserved by the AP for certain non-AP stations in which case no contention for accessing such RUs is needed for these stations. Such RUs and their corresponding scheduled non-AP stations are indicated in the trigger frame. For instance, a station identifier, such as the Association ID (AID) assigned to each non-AP station upon registration, is added in association with each Scheduled RU in order to explicitly indicate the non-AP station that is allowed to use each Scheduled RU. Such transmission mode is concurrent to the conventional EDCA mechanism.

The trigger frame TF may also designate "Random" RUs, in addition or in replacement of the "Scheduled" RUs. The Random RUs can be randomly accessed by the non-AP stations of the BSS. In other words, Random RUs designated or allocated by the AP in the TF may serve as basis for contention between non-AP stations willing to access the communication medium for sending data. A collision occurs when two or more non-AP stations attempt to transmit at the same time over the same RU. An AID equal to 0 may be used to identify random RUs.

Figure 8:
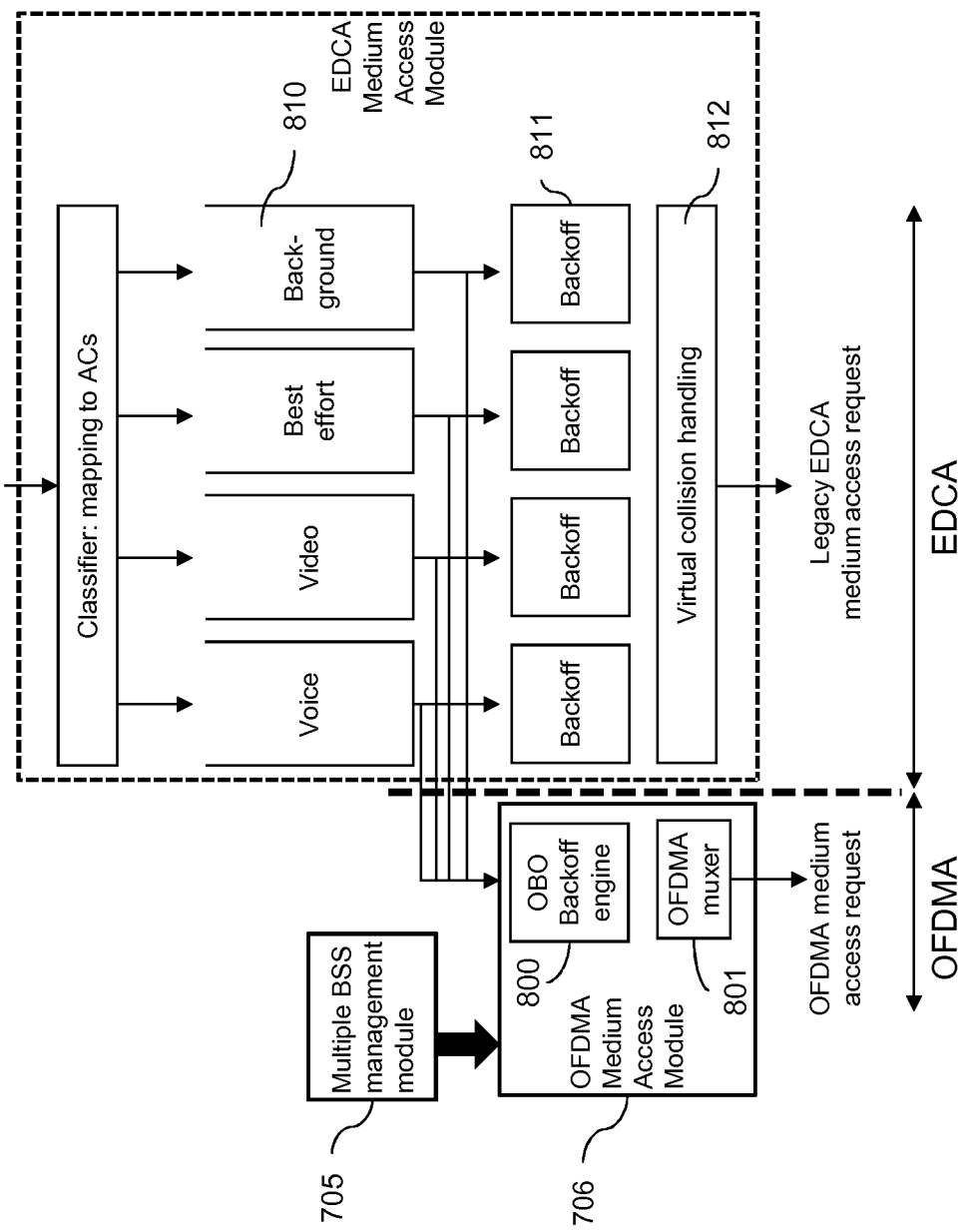
FIG. 8 illustrates an exemplary transmission block of a non-AP station.

A random access procedure may be considered for 802.11ax standard based on an additional backoff counter (OFDMA backoff counter, or OBO counter or RU counter, as further illustrated as 800 in FIG. 8) for RU contention by the 802.11ax non-AP stations, i.e. to allow them for performing contention between them to access and send data over a Random RU. The RU backoff counter is distinct from the EDCA backoff counters (illustrated as 811 in FIG. 8). However data transmitted in an accessed OFDMA RUs 310 is assumed to be served from same EDCA traffic queues (illustrated as 810 in FIG. 8).

The RU random allocation procedure comprises, for a non-AP station of a plurality of 802.11ax stations having an positive RU backoff value (initially drawn inside an RU contention window range), a first step of determining, from a received trigger frame, the sub-channels or RUs of the communication medium available for contention (the so-called "random RUs" or RA-RUs), a second step of verifying if the value of the RU backoff value local to the considered station is not greater than the number of detected-as-available random RUs, and then, in case of successful verification, a third step of randomly selecting a RU among the detected-as-available RUs to then send data. In case the second step is not verified, a fourth step (instead of the third) is performed in order to decrement the RU backoff counter by the number of detected-as-available random RUs.

In a variant, the RU random allocation procedure may similarly be executed by considering random RUs detected as available and eligible for the station (referred to as eligible RA-RUs). An eligible RA-RU is e.g. a RA-RU for which the station is capable of generating a frame (i.e., the station supports all transmit parameters corresponding to the RA-RU) and, if the station is an associated station, the AID of the RA-RU is 0.

The metrics or parameters of the OFDMA-based RU random access mechanism (such as the RU contention window range used to draw the RU backoff) are signaled by an AP through beacon frames in a new Information Element, called the RAPS element (RAPS stands for OFDMA-based Random Access Parameter Set). The format of the RAPS element is further defined in FIG. 4c. A non-AP station uses the RAPS element provided by the AP to which it is associated with. The RAPS is introduced with respect to a single BSS group of stations that is managed by one access point with which each station has previously registered.

As one can note, a non-AP station is not guarantsseed to perform OFDMA transmission over a random RU for each TF received. This is because at least the RU backoff counter is decremented upon each reception of a Trigger Frame by the number of proposed Random RUs, thereby differing data transmission to a subsequent trigger frame (depending of the current value of the RU backoff number and of the number of random RUs offered by each of further received TFs).

Back to FIG. 3, it results from the various possible accesses to the RUs that some of them are not used (310*u*) because no station with an RU backoff value less than the number of available random RUs has randomly selected one of these random RUs, whereas some other RUs have collided (310*c*) because at least two of these stations have randomly selected the same random RU. This shows that due to the random determination of random RUs to access, collision may occur over some RUs, while other RUs may remain free.

Once the non-AP stations have used the Scheduled and/or Random RUs to transmit data to the AP, the AP responds with a Multi-User acknowledgment (not show in the Figure) to acknowledge the data on each RU.

The MU Uplink (UL) medium access scheme, including both scheduled RUs and random RUs, proves to be very efficient compared to conventional EDCA access scheme, especially in dense environments as envisaged by the 802.11ax standard. This is because the number of collisions generated by simultaneous medium access attempts and the overhead due to the medium access are both reduced.

As a result, the usage of Trigger Frame is naturally extended to cover multiple BSS, i.e., when the Trigger frame is directed to non-AP stations belonging to at least two different BSSs that the AP intends to communicate.

In addition, non-associated stations (that is to say non-AP stations not yet associated to an AP) can use the RU random access procedure in order to be allowed to transmit towards the AP in any randomly allocated resource unit. Aim is to support easy association procedure in dense environments. An AID equal to 2045 may be used to identify random RUs for non-associated stations.

As currently designed, the RU random access mechanism (including the RAPS settings and the RU backoff management) is specific to a single BSS, meaning that only the non-AP stations belonging to a specific BSS are provided guidance to access the resource units included in the transmission opportunity reserved by the trigger frame emitted for such BSS. For instance, some exemplary issues will be further provided in regards to FIG. 5.

FIG. 4a represents an example format of a beacon frame usable in a 802.11 type WLAN. The represented format is given for illustrative purposes and other formats may be used. The beacon frame is a management frame used by access points in an infrastructure BSS to communicate throughout the serviced area the characteristics of the connection offered to the BSS members. Information provided in the beacon frame may be used by client stations for joining the network as well as client stations already associated with the BSS. The beacon frame can also be used by stations in an independent BSS (IBSS), i.e. an ad hoc network that contains no access points. As an example, some stations may act as a soft-AP (software implemented), that is to say implementing all the functionalities of an IEEE 802.11 Access Point but in an adhoc or transient connection mode typically for a specific purpose (e.g. for sharing documents during a meeting or playing multiple-player computer games).

Beacon frame 430 contains 24 octets of MAC header (fields 401 to 406), 0 to 2312 octets of Frame Body 407, and 4 octets of Frame Check Sequence (FCS) 408. The MAC header includes the following fields: a frame control field 401 (to indicate that the frame is a management frame of beacon subtype), a duration field 402 (set to zero), a RA (Receiver or Destination Address) field 403 (set to broadcast value FF:FF:FF:FF:FF:FF), a TA (Transmitter or Source Address) field 404 and a BSSID field 405. The BSSID field contains the identification (ID) of the BSS, which may be the MAC address of the access point servicing the BSS, i.e. identical to the content of the TA field. The Frame Body is a field of variable length and consists of two sets of fields: 1) fields that are mandatory 410, followed by 2) optional fields in the form of Information Elements IEs) 411.

Mandatory information in field 410 may contain: a Timestamp representing the time at the access point, which is the number of microseconds the AP has been active, and allowing synchronization between non-AP stations in a BSS; Beacon Interval representing the number of time units (TUs) between successive target beacon transmission times (TBTTs); and capability Info to indicate requested or advertised optional capabilities and Supported Rates fields.

All Information Elements in field 411 share a common general format consisting of 1 octet Element ID field, a 1 octet Length field, an optional 1 octet Element ID Extension field, and a variable-length element-specific Information field. Each information element is identified by the contents of the Element ID and, when present, Element ID Extension fields as defined in the 802.11 standard. The Length field specifies the number of octets following the Length field.

It is possible to address non-AP stations of a plurality of BSSs with a single beacon frame transmitted by one of the virtual APs of the physical AP, rather than multiple beacon frames transmitted by multiple virtual APs. The virtual AP transmitting the beacon frame (thus having its MAC address in the TA 404 and BSSID 405 fields) is referred to as representative AP or transmitted BSSID. The other virtual APs of the physical AP are referred to as represented APs or non-transmitted BSSIDs, as their addresses do not appear in the TA 404 and BSSID 405 fields of the beacon frame.

A Multiple BSSID information element is defined in the single beacon frame to carry the common, inherited information element values of all of the BSSIDs and the information elements specific to the non-transmitted BSSIDs (e.g., the represented virtual APs). The BSSIDs of the represented virtual APs can thus be derived from the Multiple BSSID information element.

FIG. 4b represents an example format of a Multiple BSSID information element.

The multiple BSSID information element, referenced 411a, comprises a 1-byte MAX BSSID indicator field 420 and a variable length Optional Sub-elements field 421.

More than one Multiple BSSID information element may be included in a beacon frame. The MAX BSSID Indicator field is 'n', where $2^n$ is the maximum number of BSSIDs supported by the access point, including the transmitted BSSID.

Optional Sub-elements field 421 contains zero or more sub-elements in its Data field, such as for example the "non-transmitted BSSID profile" sub-element.

The "non-transmitted BSSID Profile" may be identified by a Sub-element ID of value 0, and shall include the SSID and multiple BSSID-index sub-elements for each of the supported BSSIDs. It may include the Capabilities field followed by a variable number of information elements.

The AP may include two or more Multiple BSSID elements containing elements for a given BSSID index in one beacon frame.

When a non-AP station receives a beacon frame with a Multiple BSSID element that comprises a non-transmitted BSSID profile with only the mandatory elements (Capability element, SSID and multiple BSSID-index), it may inherit the complete profile from a previously received beacon frame.

FIG. 4c represents an example format of a RAPS Information Element.

A RAPS information element is used by non-AP stations to configure their UL MU random access mechanism. The Element_ID, and optionally the Element ID Extension, identify the RAPS format. A typical parameter that may be included in the RAPS information element is the range of the OFDMA contention window 441 (OCW Range) for 802.11ax stations willing to initiate random access following reception of a trigger frame for random access (TF-R). Such a random access trigger frame is a trigger frame having at least one Random access RU, that is to say at least one RU associated with no station (the AID subfield of the User Info field for the RU set to 0). As a result, non-associated STAs can also transmit on such random RU because they have no AID.

The OCW Range field 441 may include subfields EOCWmin and EOCWmax holding parameters to calculate the minimum (OCWmin) and the maximum (OCWmax) values of the OCW (OFDMA contention window), e.g. as follows:

$$OCW\ min = 2^{EOCWmin} - 1;\ \text{and}$$

$$OCW\ max = 2^{EOCWmax} - 1.$$

OCWmin represents the minimum value of OCW for the initial UL transmission using UL OFDMA-based random access to be used by a station for initial or successful transmission. OCWmax represents the maximum value of OCW for UL OFDMA-based random access used by a station for its retransmission attempts of UL OFDMA-based random access.

An AP includes the RAPS element in Beacon and Probe Response frames it transmits.

Figure 5:
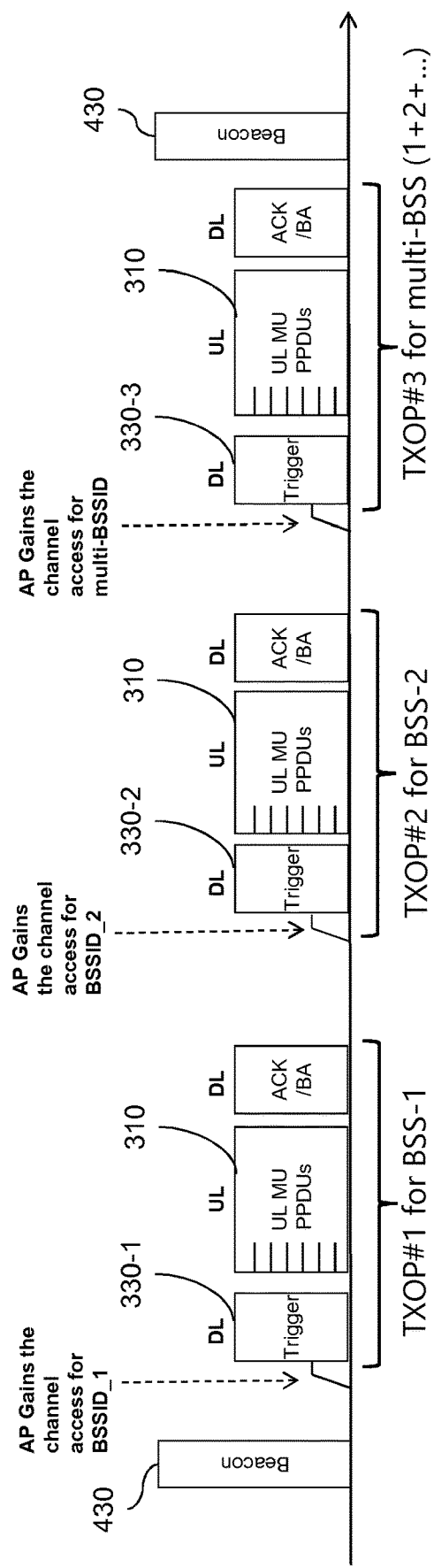
FIG. 5 illustrates some exemplary situations of the aforementioned issues of trigger frames belonging to distinct BSS contexts.

FIG. 5 illustrates some exemplary situations of the aforementioned issues of trigger frames belonging to distinct BSS contexts.

For the sake of illustration, the Trigger Frames considered in the following are all Trigger Frames offering at least one random RU.

In the approach of FIG. 5, the wireless network comprising a physical access point 110 and a plurality of stations organized into groups or sets, each group being managed by a virtual access point (e.g. VAP-1 110A and VAP-2 110B as illustrated in FIG. 1) implemented in the physical access point. The AP has emitted a beacon 430 repetitively, containing parameters of each individual BSS group.

The stations contend for an access to the wireless network, and the contention process at each station starts or restarts once the wireless network is detected as idle for a predefined time period (usually DIFS time period after the end of a previous TXOP, for instance after an acknowledgment from the AP or after end of PPDU transmission).

The physical access point thus performs the step of sending a plurality of trigger frames 330-1, 330-2, 330-3 on the wireless network to reserve successive transmission opportunities on at least one communication channel of the wireless network, each transmission opportunity being reserved for a specific group of stations (BSS) and including resource units that form the communication channel and that the stations of the specific group access to transmit data.

Consequently, the physical access point receives, in response to each trigger frame and during the corresponding reserved transmission opportunity, data 310 from one or more stations of the group specific to the trigger frame.

The AP thus performs several TXOP reservations according to the number of BSSs it wants to poll. Each reserved TXOP is independent from one another, in particular because the stations not addressed by the trigger frame set their NAV to the Duration Field specified in the Trigger Frame 330, and thus waits for this duration.

As an example, the AP acts as a VAP-1 to emit a first TF 330-1, aiming at triggering stations of group BSS-1. Secondly, it acts as VAP-2 to emit a TF 330-2, aiming at triggering stations of group BSS-2. At any moment, the AP may emit a Trigger Frame for multiple BSS groups (TF 330-3), aiming at triggering stations of whole BSS groups managed by the AP. As a result of detecting TF 330-3, a station will contend for access to the random RUs.

Random access parameters may also be used by non-associated (i.e. non-registered) stations, i.e. not yet belonging to a specific BSS group, when trying to contend for access to a random RU advertised by the trigger frame. In fact, these non-associated stations may try to access because they are not addressed by the trigger frames and their NAV is not set.

Figures 6, 7:
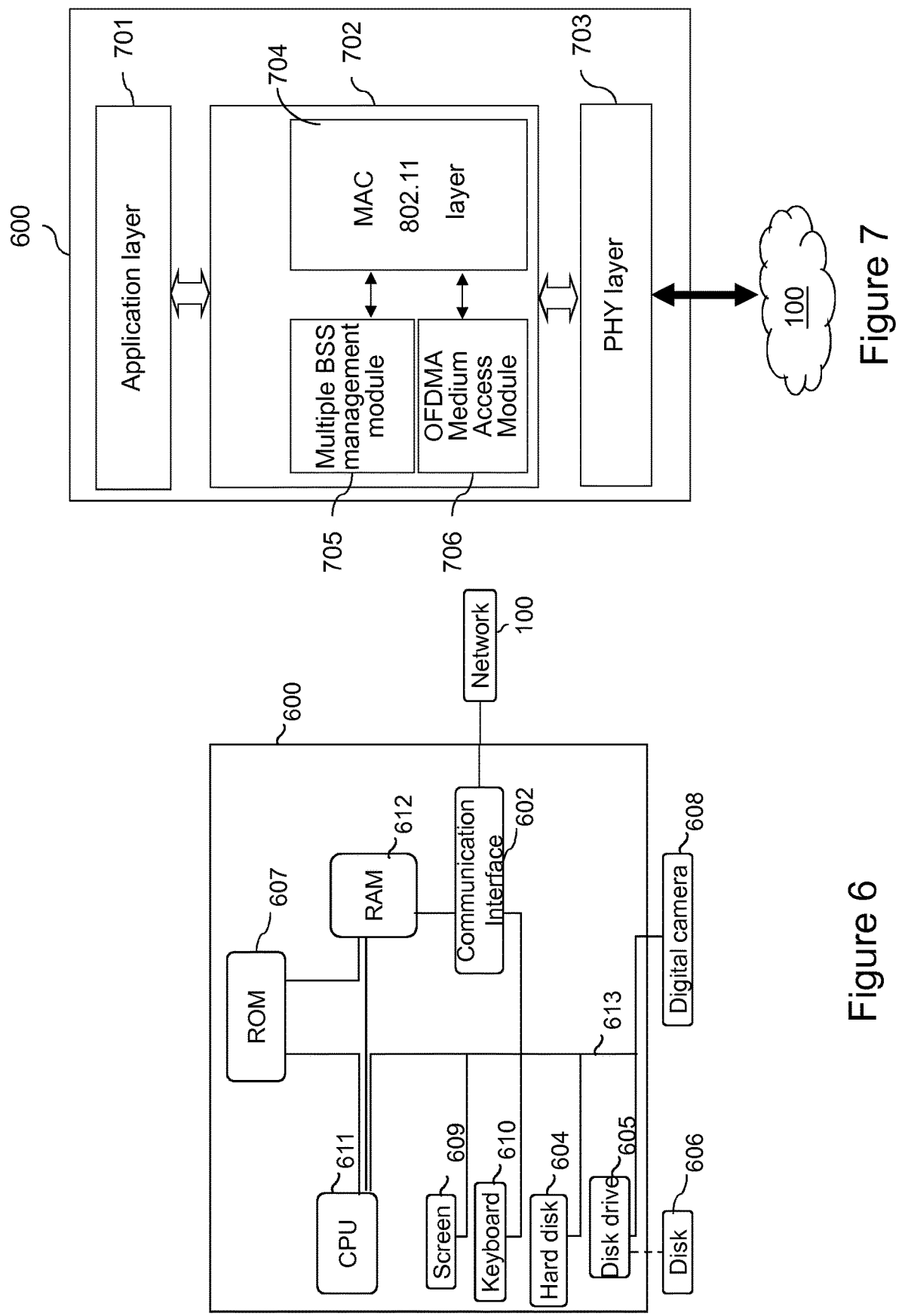
FIG. 6 shows a schematic representation a communication device in accordance with embodiments of the present invention.
FIG. 7 shows a schematic representation of a wireless communication device in accordance with embodiments of the present invention.

FIG. 6 schematically illustrates a communication device 600, either a non-AP station 101-107 or the access point 110, of the radio network 100, configured to implement at least one embodiment of the present invention. The communication device 600 may preferably be a device such as a micro-computer, a workstation or a light portable device. The communication device 600 comprises a communication bus 613 to which there are preferably connected:

a central processing unit 611, such as a microprocessor, denoted CPU;

a read only memory 607, denoted ROM, for storing computer programs for implementing the invention;

a random access memory 612, denoted RAM, for storing the executable code of methods according to embodiments of the invention as well as the registers adapted to record variables and parameters necessary for implementing methods according to embodiments of the invention; and at least one communication interface 602 connected to the radio communication network 100 over which digital data packets or frames or control frames are transmitted, for example a wireless communication network according to the 802.11ax protocol. The frames are written from a FIFO sending memory in RAM 612 to the network interface for transmission or are read from the network interface for reception and writing into a FIFO receiving memory in RAM 612 under the control of a software application running in the CPU 611.

Optionally, the communication device 600 may also include the following components:

a data storage means 604 such as a hard disk, for storing computer programs for implementing methods according to one or more embodiments of the invention;

a disk drive 605 for a disk 606, the disk drive being adapted to read data from the disk 606 or to write data onto said disk;

a screen 609 for displaying decoded data and/or serving as a graphical interface with the user, by means of a keyboard 610 or any other pointing means.

The communication device 600 may be optionally connected to various peripherals, such as for example a digital camera 608, each being connected to an input/output card (not shown) so as to supply data to the communication device 600.

Preferably the communication bus provides communication and interoperability between the various elements included in the communication device 600 or connected to it. The representation of the bus is not limiting and in particular the central processing unit is operable to communicate instructions to any element of the communication device 600 directly or by means of another element of the communication device 600.

The disk 606 may optionally be replaced by any information medium such as for example a compact disk (CD-ROM), rewritable or not, a ZIP disk, a USB key or a memory card and, in general terms, by an information storage means that can be read by a microcomputer or by a microprocessor, integrated or not into the apparatus, possibly removable and adapted to store one or more programs whose execution enables a method according to the invention to be implemented.

The executable code may optionally be stored either in read only memory 607, on the hard disk 604 or on a removable digital medium such as for example a disk 606 as described previously. According to an optional variant, the executable code of the programs can be received by means of the communication network 603, via the interface 602, in order to be stored in one of the storage means of the communication device 600, such as the hard disk 604, before being executed.

The central processing unit 611 is preferably adapted to control and direct the execution of the instructions or portions of software code of the program or programs according to the invention, which instructions are stored in one of the aforementioned storage means. On powering up, the program or programs that are stored in a non-volatile memory, for example on the hard disk 604 or in the read only memory 607, are transferred into the random access memory 612, which then contains the executable code of the program or programs, as well as registers for storing the variables and parameters necessary for implementing the invention.

In a preferred embodiment, the apparatus is a programmable apparatus which uses software to implement the invention. However, alternatively, the present invention may be implemented in hardware (for example, in the form of an Application Specific Integrated Circuit or ASIC).

FIG. 7 is a block diagram schematically illustrating the architecture of the communication device 600, either the AP 110 or one of stations 101-107, adapted to carry out, at least partially, the invention. As illustrated, device 600 comprises a physical (PHY) layer block 703, a MAC layer block 702, and an application layer block 701.

The PHY layer block 703 (here an 802.11 standardized PHY layer) has the task of formatting, modulating on or demodulating from any 20 MHz channel or the composite channel, and thus sending or receiving frames over the radio medium used 100, such as 802.11 frames, for instance medium access trigger frames TF 330 (FIG. 3) to reserve a transmission slot, MAC data and management frames based on a 20 MHz width to interact with legacy 802.11 stations, as well as of MAC data frames of OFDMA type having smaller width than 20 MHz legacy (typically 2 or 5 MHz) to/from that radio medium.

The MAC layer block or controller 702 preferably comprises a MAC 802.11 layer 704 implementing conventional 802.11ax MAC operations, and additional blocks 705 and 706 for carrying out, at least partially, the invention. The MAC layer block 702 may optionally be implemented in software, which software is loaded into RAM 612 and executed by CPU 611.

Preferably, the additional block 705, referred to as multiple BSS management module for controlling access to random OFDMA resource units (sub-channels) in case of multiple BSSs, implements the part of embodiments of the invention that regards non-AP station and/or AP operations of device 600.

For instance and not exhaustively, the operations for the AP may include generating and sending beacon frames as defined below, i.e. beacon frames identifying a plurality of groups, instead of a single BSS, including a specific group referencing several BSSs (multiple-BSS group) forming the whole network cell, and then managing the RAPS profile for random access of resource units during the reserved TXOP to such multiple-BSS group; the operations for a station different from the AP may include analysing received beacon frames to determine if the station is allowed to access some resource units in the context the trigger frames allow several BSSs to communicate during the reserved TXOP.

Preferably, the additional block 706, referred as to OFDMA Medium Access module for configuring and updating the OFDMA-based UL MU random access procedure, implements the part of embodiments of the invention that regards non-AP station operations of device 600.

MAC 802.11 layer 704, multiple BSS management module 705 and OFDMA Medium Access module 706 interact one with the other in order to process accurately communications over multiple BSS groups according to embodiments of the invention.

On top of the Figure, application layer block 701 runs an application that generates and receives data packets, for example data packets of a video stream. Application layer block 701 represents all the stack layers above MAC layer according to ISO standardization.

FIG. 8 illustrates an exemplary transmission block of a communication non-AP station 600.

As mentioned above, the station includes an EDCA channel access module and possibly an OFDMA access module 706, both implemented in the MAC layer block 702. The EDCA channel access module includes:

a plurality of traffic queues 810 for serving data traffic at different priorities; Usually, four Access Categories (ACs) are the following in decreasing priority order: voice (or "AC_VO"), video (or "AC_VI"), best effort (or "AC_BE") and background (or "AC_BG").

a plurality of queue backoff engines 811, each associated with a respective traffic queue for using a set of EDCA parameters, in particular to compute a respective queue backoff value, to be used by an associated backoff counter to contend for access to at least one communication channel in order to transmit data stored in the respective traffic queue.

Since the traffic queues or ACs operate concurrently in accessing the wireless medium, it may happen that two traffic queues of the same communication station have their backoff ending simultaneously. In such a situation, a virtual collision handler (812) of the MAC controller operates a selection of the AC having the highest priority between the conflicting ACs, and gives up transmission of data frames from the ACs having lower priorities.

Service differentiation between the ACs is achieved by setting different queue backoff parameters between the ACs, such as different $CW_{min}$, $CW_{max}$, AIFSN and/or different transmission opportunity duration limits (TXOP_Limit). This contributes to adjusting QoS. This is the EDCA access scheme.

The OFDMA access module includes an OBO backoff engine 800 separate from the queue backoff engines, for using RU contention parameters, in particular to compute an RU backoff value, to be used by an RU backoff counter to contend for access to the OFDMA random resource units defined in a received TF (sent by the AP for instance), in order to transmit data stored in either traffic queue in an OFDMA RU. The OBO backoff engine 800 is associated with a transmission module, referred to as OFDMA muxer 801. For example OFDMA muxer 801 is in charge, when the RU backoff value described below reaches zero, of selecting data to be sent from the AC queues 810.

The conventional AC queue back-off registers 811 drive the medium access request along EDCA protocol (channel contention access scheme), while in parallel, the OBO backoff engine 800 drives the medium access request onto OFDMA multi-user protocol (MU UL contention access scheme).

As these two contention access schemes coexist, the non-AP station implements a medium access mechanism with collision avoidance based on a computation of backoff values:

a queue backoff counter value corresponding to a number of time-slots the station waits (in addition to an AIFS period), after the communication medium has been detected to be idle, before accessing the medium. This is EDCA;

an RU backoff counter value corresponding to a number of idle random RUs the station detects, after a TXOP has been granted to the AP or any other station over a composite channel formed of RUs, before accessing the medium.

The multiple BSS management module 705 aims at storing RAPS profiles for at least two BSS groups, and supports the configuration of OBO backoff engine 800 for controlling access to random OFDMA resource units (sub-channels) for a given BSS group. This procedure will be further detailed according to description of FIGS. 10a and 10b.

Embodiments of the present invention are now illustrated using various exemplary embodiments in the context of IEEE 802.11ax by considering OFDMA sub-channels and multiple BSS groups. Although the proposed examples use the trigger frame 330 (see FIG. 3) sent by an AP for a multi-user uplink transmissions, equivalent mechanisms can be used in a centralized or in an adhoc environment (i.e. without an AP).

Although the present invention is also described with reference to beacon frame embodiments, the present invention is not limited to beacon frame modification but also any 802.11 management frame such as the probe response frames.

Also the invention is not limited to the 802.11ax context.

Below, the term legacy refers to non-802.11ax stations, meaning 802.11 stations of previous technologies that do not support OFDMA communications.

Figure 9B:
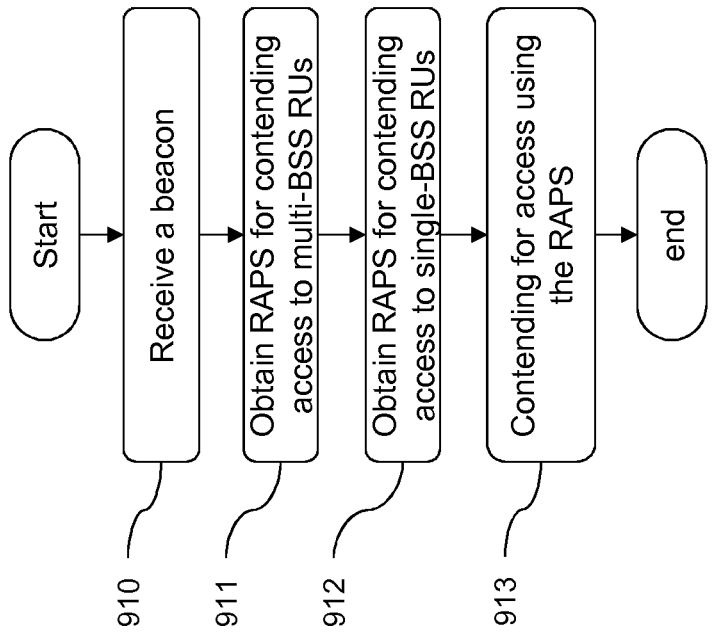
FIGS. 9a and 9b illustrate, using flowcharts, general steps of an AP generating a beacon frame, and of a station receiving a beacon frame, according to an embodiment of the invention.
Figure 9A:
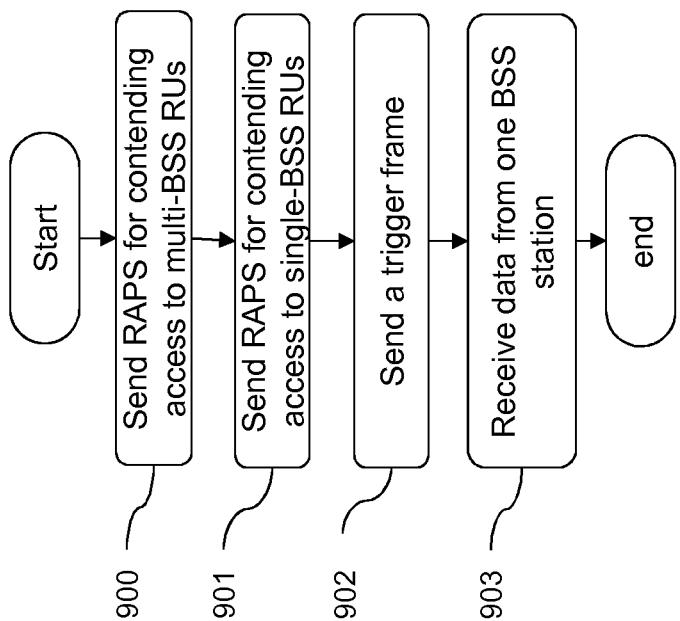

FIG. 9a illustrates, using a flowchart, an embodiment of the invention implemented at a physical access point.

At step 900, the AP sends a joint set of random access parameters values (named MBSS-RAPS) to be used in common by non-AP stations of the plurality of groups identified in a multi-BSS trigger frame (sent at step 902) to contend for access to a random resource unit included in the transmission opportunity. The joint set of parameters values may be transmitted by the physical AP according to different variants, among which: transmission in a beacon frame either as a dedicated information element (Multiple BSSID element) or a RAPS element containing the parameters values for the transmitted BSSID.

At step 901, the AP sends an individual set of random access parameters values (RAPS) to be used by non-AP stations belonging to the group identified in the single-BSS trigger frame (sent at step 902) to contend for access to a random resource unit included in the transmission opportunity. The individual set of parameters values may be transmitted by the physical AP in a beacon frame as a RAPS element contained in the non-transmitted BSSID profile sub-element 421.

In a preferred embodiment, the parameters values of the MBSS-RAPS are proportional with those of RAPS of a given individual BSS group. As an example, if a given BSS group holds 10 stations whereas 100 are registered among the overall plurality of groups, then the physical AP may apply a scaling contention such that set that OCWmin of MBSS-RAPS (OCWmin_MBSS_RAPS) is ten time greater than OCWmin of a RAPS (OCWmin_RAPS).

At step 902, a trigger frame is sent by the AP for reserving a transmission opportunity on at least one communication channel of the wireless network. The transmission opportunity includes random resource units that the non-AP stations may access using a contention scheme. In other words, the trigger frame comprises associations between resource units and stations, that may be used by the stations to transmit data during a transmission opportunity (step 913 of FIG. 9b, step 1109 of FIGS. 11a and 11b).

On the one hand, the trigger frame may be a "multi-BSS trigger frame" (e.g. 330-3) that identifies a plurality of groups, stations of which are allowed to contend for access to the random resources units included in the transmission opportunity to transmit data. Such multi-BSS trigger frame may have a TA field equal to the transmitted BSSID address, that is to say the address used to emit the beacon frame.

On the other hand, the trigger frame may be a "single-BSS trigger frame" identifying a single group, stations of which are allowed to contend for access to the random resources units included in the transmission opportunity to transmit data. In a preferred embodiment, such single-BSS trigger frame may have a TA field equal to any non-transmitted BSSID address. Preferably, an AID equal to 2045 may not be used inside a single-BSS trigger frame but only in a multi-BSS trigger frame. Thus, non-associated stations may be able to use the RAPS of the transmitted BSSID in order to associate with the physical AP.

At step 903, and in response to reception of the trigger frame by a non-AP station, the AP receives, over the random resource unit, data from a non-AP station of the single group, or from one of the plurality of groups identified in the trigger frame.

In a variant, the AP may only apply steps 900, 901 (resp. 902), 903, and then steps 900, 902 (resp. 901) and 903.

FIG. 9b illustrates, using a flowchart, an embodiment of the invention implemented at a non-AP station belonging to a first group. The communication network further comprises at least one second group.

At step 910, a beacon frame is received from the physical access point.

At step 911, a joint set of random access parameters is obtained to be used in common by stations of the first and second groups to contend for access to a random resource unit included in the transmission opportunity. For obtaining the joint set of random access parameters, the station has to detect and analyze the beacon frame received at step 910, separate from the trigger frame, received from the physical access point. According to the example of FIG. 9a, the joint set is located in the transmitted BSSID group of elements of the beacon frame.

At step 912, an individual set of random access parameters is obtained to be used only by stations of the first group to contend for access to a random resource unit included in the transmission opportunity. The station obtains the individual set of random access parameters by decoding the beacon frame(s), separate from the trigger frame, received from the physical access point. According to the example of FIG. 10a, each individual set is located in a non-transmitted BSSID group of elements of the beacon frame; and the station locates its own inside the group of elements corresponding to the BSS with which the station is associated.

In an embodiment, a non-AP station which supports the multiple BSSID feature and that belongs to a non-transmitted BSSID, may store the two RAPS profiles. That is to say the station may memorize both the RAPS to be used in common by stations (also previously called MBSS-RAPS), and also the RAPS to be used by stations belonging to the first group. Once a new beacon frame is received that provides changes, previously stored OCWmin and OCWmax values may be updated by updating values of one or the two BSS groups.

In a variant, a station registered with the transmitted BSSID (e.g., managed by the representative AP), may only apply one of steps 911 or 912 (as its own single-group corresponds to the multi-BSS group, the individual set equals the joint set). Thus, stations registered with the transmitted BSSID shall only store the RAPS profile corresponding to the transmitted BSSID.

This may also be the case of a non-associated station that may preferably use the RAPS of the transmitted BSSID. Non-associated stations may only maintain the RAPS of transmitted BSSID and the AP may only provide RU(s) with an AID equal to 2045 inside a multi-BSS trigger frame. A single-BSS trigger frame may not contain random RU for non-associated stations.

In an example, the transmitted BSSID group may not contain any registered station. The "multi-BSS trigger frame" which provide RU(s) with an AID equal to 2045 may be used as a support for registering non-AP stations onto the first group. The "multi-BSS trigger frame" which provide RU(s) with an AID equal to 0 may be used as a support for allowing any non-AP station associated with any group to communicate according to the OFDMA random access procedure.

At step 913, the station contends for access to the random resource unit using the obtained individual set of random access parameters. This step is further detailed by the description of FIGS. 11a and 11b.

In a variant, the non AP station may only apply steps 910, 911 (resp. 912), 913, and then steps 910, 912 (resp. 911) and 913.

Figure 10B:
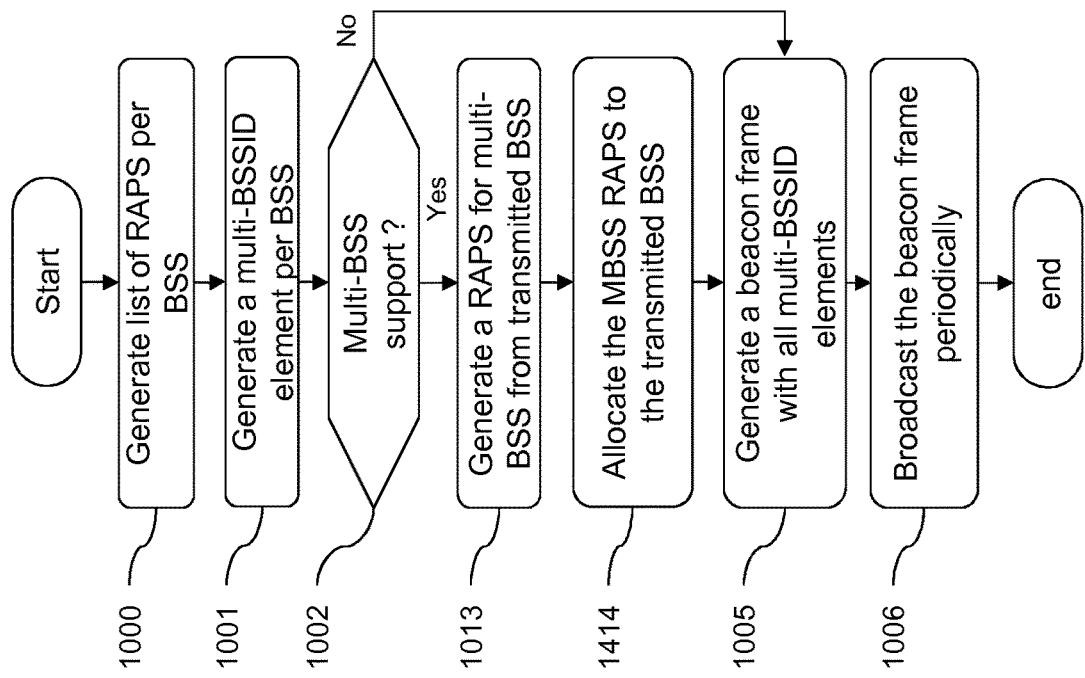
FIGS. 10a and 10b illustrate, using flowcharts, general steps of an AP emitting a beacon frame for multiple BSS, according to embodiments of the invention.
Figure 10A:
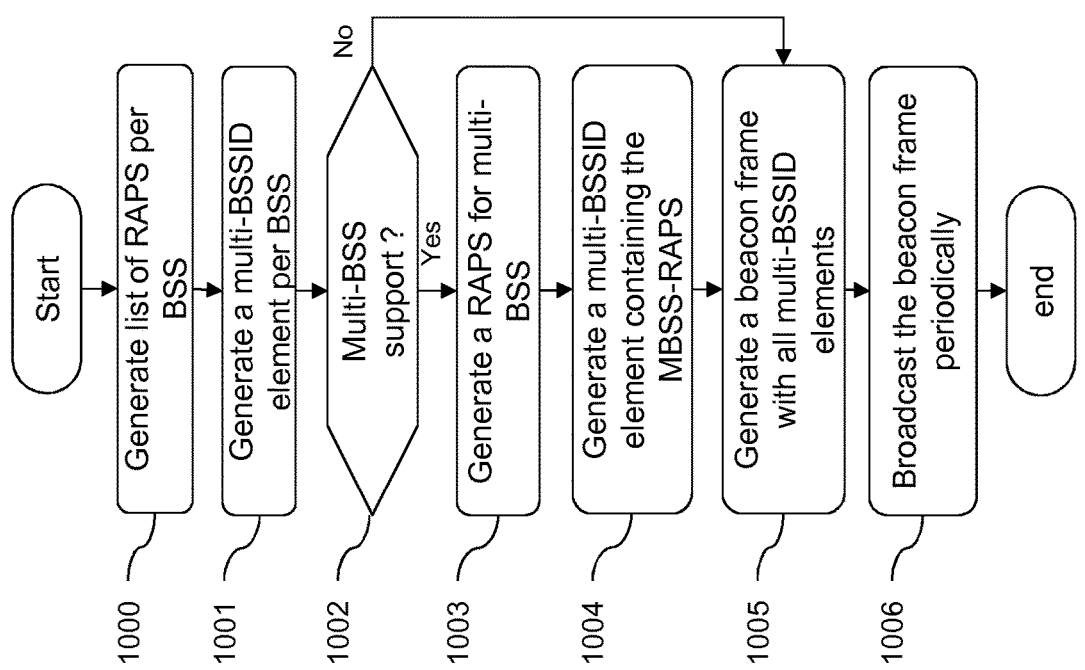

FIGS. 10a and 10b illustrate, through flowcharts, two embodiments in which the AP generates and provides RAPS profiles for non-AP stations of various BSSs. Similar steps have the same references.

These methods are typically implemented in an access point of the invention.

Initially, a list of RAPS profiles (each for a given BSS) is generated in addition to classical (e.g. security) profiles and SSIDs to be advertised (step 1000).

The profiles of transmitted BSSID group are provided in list of IE 411 of the beacon frame body 407. The profile of at least one non-transmitted BSSID group is provided through Multiple BSSID elements 411a to be appended later in list 411 of the beacon frame body 407.

In case only one BSS is supported by the AP ("No" to test 1002), the algorithm continues to step 1005 comprising formatting the beacon frame and later periodically emitting that beacon frame (step 1006).

If multi-BSS support is available ("yes" to test 1002), a dedicated RAPS profile corresponding to the plurality of groups of stations is added to the Beacon Frame (steps 1003 and 1004).

This dedicated RAPS profile or element (further identified as MBSS-RAPS) aims to be used by any non-AP station of the network for contending access during a TXOP reserved for a plurality of groups of stations (e.g. by means of Trigger Frame 330-3 of FIG. 5) to upload data to AP.

The OCW Range (441) for the MBSS-RAPS may be adapted to the whole cell; for example by averaging various EOCWmin and EOCWmax values used for the different BSS groups. The AP may use any proprietary or internal consideration for determining these values, as for example the density of non-AP stations, measured contention or network load encountered in each individual BSS it manages.

The algorithm then continues to step 1005 comprising formatting the beacon frame and later periodically emitting that beacon frame (step 1006). That beacon frame corresponds to the one received at step 910 of FIG. 9b.

Preferably, the MBSS-RAPS (which format is compliant with 411b) is directly provided as an Information Element in the list 411: for that purpose, values of Element_ID and Element_ID Extension fields are used to guarantee that the MBSS-RAPS element is distinct from RAPS elements already defined for individual BSSs.

Alternatively, the MBSS-RAPS is defined through a distinct Multiple BSSID element 411a, identifying that the concerned BSS is a multiple BSS. This new multiple BSSID information element would comprise the same MAX BSSID indicator value, but the MBSS-RAPS is conveyed inside a newly defined Non-Transmitted BSSID Profile corresponding to all (or at least several) BSSs. This Non-Transmitted BSSID Profile for MBSS-RAPS transmission can be identified by a Sub-element ID of value distinct from 0.

As a result, the AP has managed transmission to the non-AP stations of an additional RAPS profile, called the MBSS-RAPS profile, dedicated to the multi-BSS Trigger Frame case.

FIG. 10b illustrates an alternative method to provide the MBSS-RAPS profile.

In order to limit the number of RAPS elements provided into the beacon frame, the basic profile of the transmitted BSSID, i.e. of the representative AP, is selected as MBSS-RAPS profile, i.e. joint profile for the BSSs (step 1014). That is to say the RAPS profile to be used by non-AP stations is the RAPS profile of the transmitted BSSID (e.g. the BSS identified by BSSID field 405). As a result, the RAPS profile (embedding the MBSS-RAPS values) is located in the list 411, before any Multiple BSSID element 411a of non-transmitted BSSIDs. Access to this profile requires less processing and is quicker.

Optionally, the computation of values forming the OCW Range may be different from previous scheme as the parameters are identical for Trigger Frames received in a single transmitted BSS and multi-BSS contexts (step 1013).

The approach of FIG. 10b saves bandwidth space in management frames such as the beacon frames.

The alternative method of FIG. 10b provides further advantages of using the RAPS profile from the transmitted BSSID as a default profile: consequently, low-end AP devices may, by simplicity, only consider this profile for Trigger Frames issued both from their non-transmitted BSSID contexts (with condition that no specific RAPS is provided in their non-transmitted BSSID) and for their multi-BSS context. Those AP devices are considered as low-end AP devices because they are limited in their RAPS capabilities to adapt per BSS to changing conditions (like number of registered stations, contention, etc.).

Finally, the Beacon Frame is modified by the AP to identify a plurality of RAPS profiles allowed to be used for performing uplink OFDMA transmission in random RUs.

Any non-AP station that wants to know which RAPS profile it can access, thus has to:

1) read, within the received beacon frame, a plurality of per-BSS RAPS parameter sections 411b additional to legacy information elements (inside 421); this includes transmitted and non-transmitted BSSID groups;

2) for at least one per-BSS parameter section 420 defining a BSSID:

determine, based on one BSSID field included in the per-BSS parameter section (405 or inside 411*a*), whether it is willing to join this BSS group, store, based on the BSSID, the RAPS profile inside its module 705.

Next, as further described by FIG. 11, in case the non-AP station is authorized to access the one or more determined random resource units for a received Trigger Frame, it accesses the RAPS profiles to initiate the random access procedure applicable to the reserved transmission opportunity.

Figure 11A:
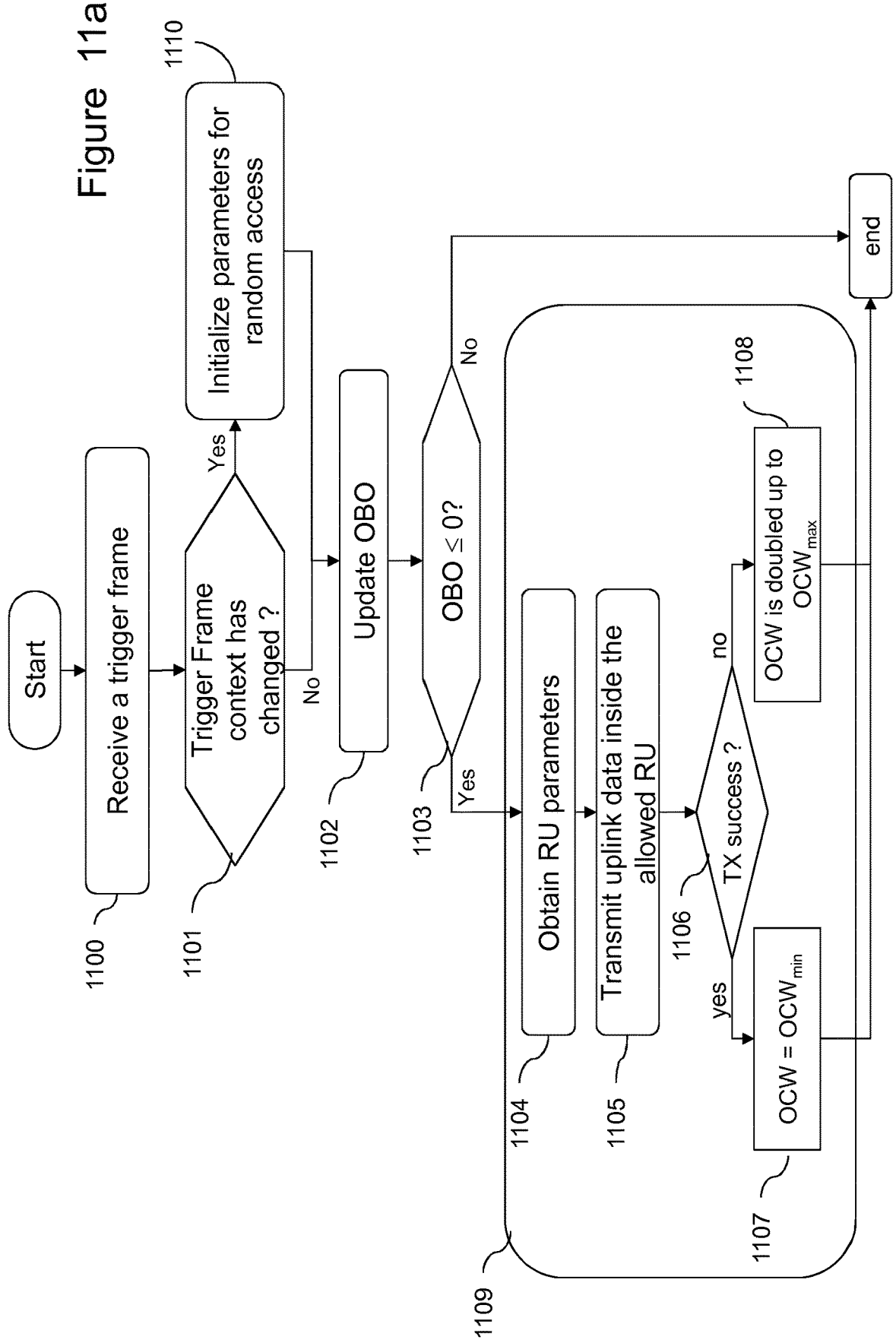
FIGS. 11a and 11b illustrate, using flowcharts, general steps of a non-AP station receiving a Trigger Frame and contending for access to a random resource unit, according to embodiments of the invention.

FIG. 11*a* illustrates, using a flowchart, general steps of a non-AP station receiving a Trigger Frame and contending for access to a random resource unit, according to an embodiment of the invention.

At step 1100, station 600 receives a trigger frame from an Access Point. This trigger frame corresponds to the one transmitted at step 902 of FIG. 9*a*.

If the receiving station belongs to one BSS (or virtual BSS) of the transmitting physical AP, the Trigger Frame is not filtered by the PHY layer as defined in the standard. The filtering may be made on so-called "colors" defined in the 802.11ax standard, which mandates that the BSS colors of all the multiple BSSs managed by a single AP are the same.

At step 1101, station 600 analyzes the received trigger frame at the MAC layer.

In particular, TA (404) and RA (403) fields are analyzed. The station checks whether the received trigger frame identifies one (and then defines a single BSS scheme) or a plurality of groups (and then defines a multiple BSS scheme), with which it is registered (or willing to register with). It consists in checking whether one of TA (404) or RA (403) fields define a plurality of BSSs or not, i.e. if they include the BASE_BSSID or any other multi-BSS address like the transmitted BSSID.

Going back to step 1101, a test is performed to determine if the context of the current trigger frame (received at step 1100) is the same as the context of a previously received trigger frame or the same as the initial context (that may preferably correspond to the single-BSS context).

If a previously received and the current trigger frames indicate that no multiple BSS scheme is used, or that the multi-BSS address does not encompass the specific BSSID of station 600 (that is to say the TA field of the Trigger Frame contains a non-transmitted BSSID value corresponding to the BSSID the station 600 is associated with), an OFDMA random access procedure is applied (test 1101 negative). In this case, conventional RAPS profile associated with the BSSID the station 600 is associated with, may be used during the random access procedure.

If the multiple BSS scheme is used (e.g. the multi-BSS address encompasses the BASE_BSSID to which station 600 is registered, that is to say the TA field of the Trigger Frame contains the transmitted BSSID value), an OFDMA random access procedure is performed while considering the multi-BSS profile (MBSS-RAPS) for the random access procedure (test 1101 negative).

Otherwise, if the previously received and the current trigger frames indicate a BSS scheme change (i.e. a change of context), then step 1110 is applied (test 1101 positive).

Step 1110 is now detailed, by describing the steps performed to initialize the random access procedure within a new context of execution.

After retrieving the RAPS profile (the received RAPS corresponding to the BSSID of the currently received trigger frame) stored in steps 911 or 913, the station 600 may both initialize the range of OFDMA contention window (OCW) and initiate its OFDMA random access backoff (OBO).

Alternatively, the non-AP station can use the initial context in case no beacon frame with RAPS for contending access to multi-BSS RUs was previously received.

If the Trigger frame for random access has the TA field set to the transmitted BSSID, a non-AP station with Multiple BSSID support set to true, associated with a non-transmitted BSSID, and that supports receiving Control frames with a TA field set to the Transmitted BSSID, may both initialize the range of OFDMA contention window (OCW) and initiate (redraw) its OFDMA random access backoff (OBO) based on the retrieved RAPS values.

In other words, each time a non-AP station, that is associated with a non-transmitted BSSID, that supports the multiple BSSID feature and that supports receiving control frames with a TA field set to the transmitted BSSID, receives a trigger frame for random access with a TA field different from the last received trigger frame for random access, the non-AP station may initialize its OFDMA contention window (OCW) based on the initial context or based on the most recently received RAPS profile corresponding to the BSSID indicated in the received TA field, and initialize its OFDMA random access backoff (OBO).

According to this rule, the random access procedure does not re-initializes neither its OCW nor its OBO counter as long as successively received trigger frames with random access belong to the same BSSID (the non-transmitted BSSID or respectively the transmitted BSSID). This corresponds to successive executions of flowchart of FIG. 11*a* without disruption of the concerned BSS group. In other words, the AP sends a series of trigger frames for the plurality of groups (respectively the same single group for a station point of view).

As a result, for an initial attempt of random access communication within a given RAPS profile or after each successful UL transmission in a random-access RU (as further described by step 1106), the non-AP station may set the value of OCW to the OCWmin (obtained from the most recent OCWmin indicated in the RAPS Parameter Set element from the AP emitting the trigger frame), and may initialize its OBO counter to a random integer value in the range of 0 and OCW. As one can note, switching between a multiple BSS context and a single BSS context (and vice versa) is considered as an initial transmission attempt.

In a preferred embodiment, in step 1110, if the beacon frame (received at step 910 of FIG. 9*b*) conveys a modified RAPS profile, then the station may update the RAPS parameters to consider (e.g., the current value of OCWmin is set to an updated value of OCWmin corresponding to the one given in the last received beacon frame and/or the current value of OCWmax is set to an updated value of OCWmax corresponding to the one given in the most recently received beacon frame). Then, the OBO counter is redrawn.

In a variant, the station shall update its OCW value under the condition that the updated OCW remains within the range [OCWmin, OCWmax] obtained from the most recently received RAPS. If the updated OCW becomes greater than OCWmax (respectively lower than OCWmin) as consequence of the last received RAPS profile, then the station may set the value of OCW to the corresponding boundary value.

In a variant, if the current OCW value (that is to say issued for a preceding RAPS context) is greater or equal than the OCWmax value of the upcoming RAPS context, then the OCW value is reinitialized to the OCWmax. Furthermore, the OBO counter is redrawn only if it exceeds the new OCWmax value.

In a variant, if the OCWmin value of the upcoming RAPS profile is lower than the OCWmin value of the preceding RAPS profile, then the OCW value is not updated and the OBO counter is not redrawn.

In a variant, when the OCWmin value of the upcoming RAPS profile is greater than the OCWmin value of the preceding RAPS profile, if the current OCW value (that is to say issued for a preceding RAPS profile for the same BSSID context) is lower than the OCWmin value of the upcoming RAPS context, then the OCW value is reinitialized and the OBO counter is redrawn.

In a variant, only the OCW value may be updated (not the current OBO counter value). The OBO may be updated once it reaches down to zero (or in case the BSSID context has changed as disclosed previously).

The legacy OFDMA random access procedure is then applied, based on a RAPS profile: either with the conventional RAPS profile associated with the BSSID the station 600 is associated with, or with the multi-BSS RAPS profile (MBSS-RAPS).

The RU random access procedure comprises a first step of determining, from the received trigger frame, the eligible RUs available for contention. A RA-RU can be determined using for instance a predetermined AID associated with each RU defined in the TF. In particular, a RU having an AID equal to 0 may be accessed by all non-AP stations belonging to the BSS managed by the Access Point having transmitted the trigger frame at step 902, and a RU having an AID equal to 2045 may be accessed by all non-associated stations of the communication network.

So the number of random Resource Units supporting the random OFDMA contention scheme ($Nb_{RU}$) is known at this stage. Determining the number of random RUs may be advantageous since the number of random RUs may vary from one TF to another other.

The RU random access procedure comprises a second step of decrementing the RU backoff counter (OBO), e.g., OBO=OBO–$Nb_{RU}$ (step 1102), before contending access to a random resource unit of the transmission opportunity reserved by the received trigger frame (step 1109 including steps 1104 to 1108), depending on the updated backoff counter value. At step 1103, it is determined if the resulting OBO value is negative or null. If the OBO is negative or null, then the station (third step) is allowed to select an RU for transmission (step 1104). Otherwise, the OBO is already prepared to wait a further trigger frame for random access and the algorithm stops.

At step 1103, it is compared if the updated OBO value is negative or null. In case the OBO is still positive (and considered as not expired), the given station 600 is not eligible to contend for access, and the process ends for this received trigger frame.

Otherwise, step 1104 is executed to determine the RU the station can access through contention. It is a RU randomly selected from the available random RUs ($Nb_{Ru}$) of the received TF.

Next to step 1104, step 1105 is performed during which station 600 accesses the RUs determined at step 1104 and transmits its trigger-based PPDU in uplink direction to the AP. Such data corresponds to the one received at step 903 of FIG. 9a.

As commonly known, the destination station (the AP) sends an acknowledgment related to each received MPDU from multiple users inside the OFDMA TXOP, so that the non-AP station 600 may update its OCW contention value accordingly. It has to be noted that the OCW is always updated through the individual parameter set of the BSS group to which the non-AP station is associated (and not with the joint set of parameters).

Step 1106 is executed when the UL OFDMA transmission finishes on an accessed random RU, upon having the status of transmission; either by receiving a positive or negative acknowledgment from the AP.

In case of successful OFDMA transmission on the selected random RU, OCW is set to a (predetermined) low boundary value, for instance $OCW_{min}$ of the RAPS of the station's BSS, at step 1107.

In case of failing OFDMA transmission, OCW may be doubled, for instance OCW=2*OCW+1, (step 1108). Note that OCW cannot be above $OCW_{max}$ of the RAPS of the station's BSS.

Figure 11B:
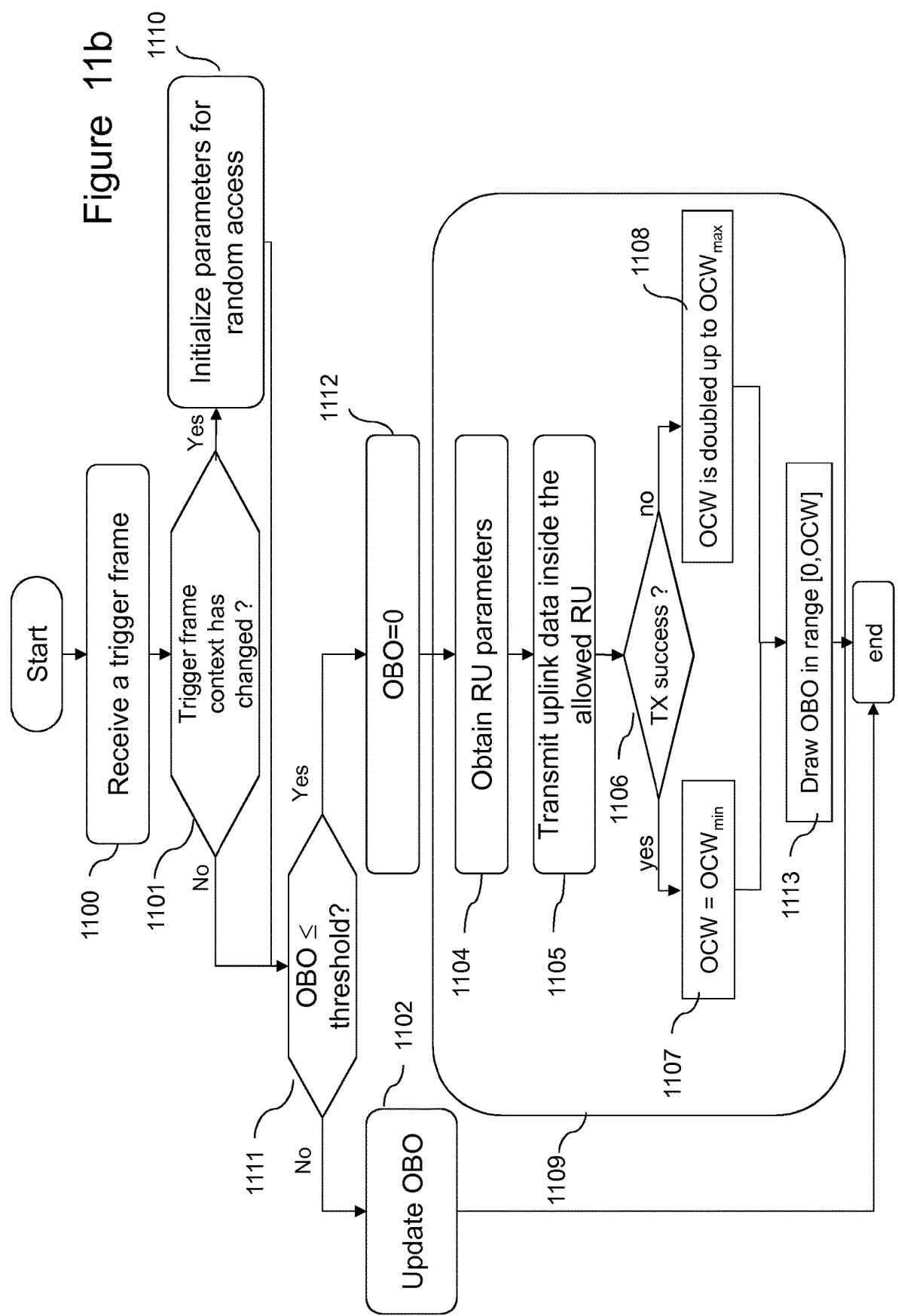

FIG. 11b, which is a variant of FIG. 11a, illustrates, using a flowchart, general steps of a non-AP station receiving a Trigger Frame and contending for access to a random resource unit, according to an embodiment of the invention. Similar steps have the same references.

At step 1100, station 600 receives a trigger frame from an Access Point. This trigger frame corresponds to the one transmitted at step 902 of FIG. 9a.

At step 1101, station 600 may analyze the received trigger frame at the MAC layer, and determine if a context change has occurred.

If true, the parameters for random access are initialized (step 1110). In a preferred embodiment, if the beacon frame (received at step 910 of FIG. 9b) conveys a modified RAPS profile, then the station may update the RAPS parameters to consider (e.g., the current value of OCWmin is set to an updated value of OCWmin corresponding to the one given in the last received beacon frame and/or the current value of OCWmax is set to an updated value of OCWmax corresponding to the one given in the most recently received beacon frame). Then, the OBO counter is redrawn. Alternatively, the other variants previously described for initializing the random parameters may be applied. Then, step 1111 may be applied.

Going back to step 1101, if the context has not changed, it is determined if the OBO counter of the considered station is not greater than the number of eligible random RUs (step 1111). If true, then the station may decrement its OBO counter to zero (step 1112). Otherwise, the station may decrement its OBO counter by the number of eligible RA-RUs in the Trigger frame (step 1102).

Going back to step 1112, step 1109 (which includes steps 1104, 1105, 1106, 1107, 1108 and 1113) is applied. A new OBO value is then drawn at step 1113 in the range [0, OCW]. This new OBO value is to be use for contending access in an eligible RU-RU of a next trigger frame.

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A wireless communication method in a wireless network comprising an access point and stations, the method comprising the following steps, at a station: receiving a trigger frame from the access point, the trigger frame reserving a transmission opportunity on at least one communication channel of the wireless network, the transmission opportunity including a random resource unit that the stations may access using a contention scheme; receiving parameters of the contention scheme in management frames from the access point, the parameters comprising a contention window range; contending access to the random resource unit of the transmission opportunity reserved by the received trigger frame, using a contention window value; and updating the contention window value based on the success or failure of a transmission over the accessed random resource unit; wherein the updated contention window value remains within the contention window range obtained from the received parameters of the contention scheme; and determining that the updated contention window value becomes greater than an upper boundary of the contention window range as a consequence of receiving modified contention scheme parameters; wherein responsive to determining that the updated contention window value becomes greater than an upper boundary of the contention window range as consequence of receiving modified contention scheme parameters, setting the updated contention window value to the value of the upper boundary and not modifying a contention backoff.

2. The method of claim 1, wherein the contention window value is chosen in the contention window range.

3. The method of claim 1, wherein the management frames are beacon frames.

4. The method of claim 1, wherein the management frames are probe response frames.

5. A non-transitory computer-readable storage medium storing instructions of computer program for implementing a wireless communication method in a wireless network comprising an access point and stations, the method comprising the following steps, at a station: receiving a trigger frame from the access point, the trigger frame reserving a transmission opportunity on at least one communication channel of the wireless network, the transmission opportunity including a random resource unit that the stations may access using a contention scheme; receiving parameters of the contention scheme in management frames from the access point, the parameters comprising a contention window range; contending access to the random resource unit of the transmission opportunity reserved by the received trigger frame, using a contention window value; and updating the contention window value based on the success or failure of a transmission over the accessed random resource unit; wherein the updated contention window value remains within the contention window range obtained from the received parameters of the contention scheme; and determining that the updated contention window value becomes greater than an upper boundary of the contention window range as consequence of receiving modified contention scheme parameters; wherein responsive to determining that the updated contention window value becomes greater than an upper boundary of the contention window range as consequence of receiving modified contention scheme parameters, setting the updated contention window value to the value of the upper boundary and not modifying a contention backoff.

6. A device for a station in a wireless network comprising an access point and stations, the device comprising a processing unit configured to carry out the following steps: receiving a trigger frame from the access point, the trigger frame reserving a transmission opportunity on at least one communication channel of the wireless network, the transmission opportunity including a random resource unit that the stations may access using a contention scheme; receiving parameters of the contention scheme in management frames from the access point, the parameters comprising a contention window range; contending access to the random resource unit of the transmission opportunity reserved by the received trigger frame, using a contention window value; and updating the contention window value based on the success or failure of a transmission over the accessed random resource unit; wherein the updated contention window value remains within the contention window range obtained from the received parameters of the contention scheme; and determining that the updated contention window value becomes greater than an upper boundary of the contention window range as consequence of receiving modified contention scheme parameters: wherein responsive to determining that the updated contention window value becomes greater than an upper boundary of the contention window range as consequence of receiving modified contention scheme parameters, setting the updated contention window value to the value of the upper boundary and not modifying a contention backoff.

7. The device of claim 6, wherein the processing unit is configured so that the contention window value is chosen in the contention window range.

8. The device of claim 6, wherein the management frames are beacon frames.

9. The device of claim 6, wherein the management frames are probe response frames.

* * * * *